(12) United States Patent
Jo et al.

(10) Patent No.: US 11,599,989 B2
(45) Date of Patent: *Mar. 7, 2023

(54) INSPECTION METHOD AND APPARATUS

(71) Applicant: COGLIX CO.LTD., Hanam-si (KR)

(72) Inventors: Seoung Je Jo, Gyeonggi-do (KR); Jae Hun Park, Gyeonggi-do (KR); Boo Han Lee, Seoul (KR)

(73) Assignee: Coglix Co. Ltd.

( * ) Notice: Subject to any disclaimer, the term of this patent is extended or adjusted under 35 U.S.C. 154(b) by 269 days.

This patent is subject to a terminal disclaimer.

(21) Appl. No.: 17/074,139

(22) Filed: Oct. 19, 2020

(65) Prior Publication Data

US 2021/0035278 A1 Feb. 4, 2021

Related U.S. Application Data

(63) Continuation of application No. 15/306,486, filed as application No. PCT/KR2016/011738 on Oct. 19, 2016, now Pat. No. 10,853,933.

(51) Int. Cl.
| | | |
|---|---|---|
| *G06T 7/00* | (2017.01) | |
| *G06K 9/62* | (2022.01) | |
| *G01N 25/72* | (2006.01) | |
| *H04N 5/33* | (2023.01) | |

(52) U.S. Cl.
CPC .............. *G06T 7/001* (2013.01); *G01N 25/72* (2013.01); *G06K 9/6253* (2013.01); *G06T 2207/10048* (2013.01); *G06T 2207/20081* (2013.01); *G06T 2207/20084* (2013.01); *G06T 2207/30136* (2013.01); *G06V 2201/06* (2022.01); *H04N 5/33* (2013.01)

(58) Field of Classification Search
CPC ........... G06T 7/001; G06T 2207/10048; G06T 2207/20081; G06K 9/6253; H04N 5/33
See application file for complete search history.

(56) References Cited

U.S. PATENT DOCUMENTS

| | | |
|---|---|---|
| 9,791,395 B2 | 10/2017 | Weinstein |
| 9,824,298 B1 * | 11/2017 | Krishnan Gorumkonda ............... G06Q 10/0832 |
| 10,007,863 B1 * | 6/2018 | Pereira ...................... G06T 7/60 |

(Continued)

FOREIGN PATENT DOCUMENTS

| | | |
|---|---|---|
| JP | 2003307505 A | 10/2003 |
| JP | 2012225728 A | 11/2012 |

(Continued)

OTHER PUBLICATIONS

Leila Yazdi, Anton Satria Prabuwono, Ehsan Golkar, Feature Extraction Algorithm for Fill Level and Cap Inspection in Bottling Machine, 2011, International Conference on Pattern Analysis and Intelligent Robotics (Year: 2011).*

(Continued)

*Primary Examiner* — Kevin Ky

(74) *Attorney, Agent, or Firm* — Nathan P. Letts; Olive Law Group PLLC

(57) ABSTRACT

In an inspection method and apparatus, when thermal image data with respect to cap sealing of a particular container is analyzed and a low confidence score is obtained, products are classified into a user check product by a rejection-process of separating the products, without determining the products to be good products or not good products.

15 Claims, 42 Drawing Sheets

(56) References Cited

U.S. PATENT DOCUMENTS

| | | | |
|---|---|---|---|
| 10,853,933 B2* | 12/2020 | Jo | G06K 9/6253 |
| 2004/0143600 A1* | 7/2004 | Musgrove | G06F 16/24575 |
| 2005/0177322 A1* | 8/2005 | Cosentino | G01L 5/0076 |
| | | | 702/41 |
| 2006/0218011 A1* | 9/2006 | Walker | H04L 9/3226 |
| | | | 222/23 |
| 2010/0042609 A1* | 2/2010 | Wu | G06F 16/24578 |
| | | | 707/948 |
| 2010/0217678 A1* | 8/2010 | Goncalves | G07G 1/0063 |
| | | | 382/209 |
| 2010/0231692 A1* | 9/2010 | Perlman | G06T 7/596 |
| | | | 348/48 |
| 2011/0153564 A1* | 6/2011 | Cochinwala | G06F 16/275 |
| | | | 707/610 |
| 2011/0268369 A1* | 11/2011 | Richards | G06T 5/005 |
| | | | 382/284 |
| 2012/0044348 A1* | 2/2012 | Pijl | G06T 7/74 |
| | | | 348/135 |
| 2012/0191719 A1* | 7/2012 | Musgrove | G06F 16/951 |
| | | | 707/740 |
| 2012/0249156 A1* | 10/2012 | Wang | H01L 21/67271 |
| | | | 324/537 |
| 2013/0141590 A1 | 6/2013 | Matsumoto | |
| 2013/0216094 A1* | 8/2013 | DeLean | G06K 9/6201 |
| | | | 382/103 |
| 2014/0248950 A1* | 9/2014 | Tosas Bautista | G06F 3/01 |
| | | | 463/31 |
| 2014/0258301 A1* | 9/2014 | Misra | G06F 16/36 |
| | | | 707/739 |
| 2014/0270464 A1* | 9/2014 | Nepomniachtchi | G06V 30/414 |
| | | | 382/137 |
| 2014/0311256 A1 | 10/2014 | Cochran et al. | |
| 2015/0063634 A1* | 3/2015 | Hofman | G06V 20/38 |
| | | | 382/103 |
| 2016/0054245 A1* | 2/2016 | Weinstein | B29C 65/8261 |
| | | | 250/339.14 |
| 2017/0227472 A1* | 8/2017 | Colton | B29C 49/061 |
| 2021/0035278 A1* | 2/2021 | Jo | G01N 25/72 |

FOREIGN PATENT DOCUMENTS

| | | |
|---|---|---|
| JP | 2013118547 A | 6/2013 |
| KR | 1020000031313 A | 6/2000 |
| KR | 1020020015517 A | 2/2002 |
| KR | 20050009060 A | 1/2005 |
| KR | 100661794 B1 | 12/2006 |
| KR | 1020150022249 A | 3/2015 |
| KR | 101643713 B1 | 8/2016 |
| WO | WO/2014/127431 | 8/2014 |

OTHER PUBLICATIONS

Australian Examination Report dated Dec. 2, 2019 for AU Application 2016426891 (5 pages).

Non-Final Office Action from USPTO regarding U.S. Appl. No. 15/306,486 dated Mar. 16, 2020 (11 pages).

Amendment in response to Mar. 16, 2020,Non-Final Office Action from USPTO regarding U.S. Appl. No. 15/306,486, filed Jun. 16, 2020 (11 pages).

Notice to File Corrected Application Papers from USPTO regarding U.S. Appl. No. 15/306,486 dated Aug. 20, 2020 (4 pages).

Amendment in response to Aug. 20, 2020, Notice to File Corrected Application Papers from USPTO regarding U.S. Appl. No. 15/306,486, filed Oct. 12, 2020 (5 pages).

* cited by examiner

FIG. 30B

|  | Algorithm Type A: Intermediate Complexity | Algorithm Type B: High Complexity |
|---|---|---|
| Sub-material Uniformity | 100% (70/70) | 100% (70/70) |
| Estimated Inspection Accuracy | 99.4% (157/158) | 100% (158/158) |
| EIA : Fault Type 1, Loosen | 96.4% (27/28) | 100% (28/28) |
| EIA : Fault Type 2, Overheat | 100% (30/30) | 100% (30/30) |
| EIA : Fault Type 3, Underheat | 100% (30/30) | 100% (30/30) |

FIG. 31B

| | Algorithm Type A: Intermediate Complexity | Algorithm Type B: High Complexity |
|---|---|---|
| Sub-material Uniformity | 85.7% (12/14) | 92.9% (13/14) |
| Estimated Inspection Accuracy | 94.7% (36/38) | 97.4% (37/38) |
| EIA : Fault Type 1, Loosen | 100% (6/6) | 100% (6/6) |
| EIA : Fault Type 2, Overheat | 100% (5/5) | 100% (5/5) |
| EIA : Fault Type 3, Underheat | 100% (6/6) | 100% (6/6) |
| EIA : Fault Type 4, Reversed Seal | 100% (7/7) | 100% (7/7) |

INSPECTION METHOD AND APPARATUS

RELATED APPLICATIONS

This application is a continuation of U.S. Ser. No. 15/306,486, filed Apr. 20, 2018, which was a U.S. national stage application filed under 35 U.S.C. § 371 of International Application No. PCT/KR2016/011738, filed Oct. 19, 2016, the contents of which are incorporated by reference herein in their entireties.

TECHNICAL FIELD

The present invention relates to an inspection method and apparatus, and more particularly, to an inspection method and apparatus for inspecting cap sealing of a container transferred along a process line by using an infrared (IR) camera.

BACKGROUND ART

Induction sealing, which is known as cap sealing, is a non-contact method of heating a metallic disk to hermetically seal the top of plastic and glass containers. This sealing process takes place after the container has been filled, for example, tablets, and capped. A closure is supplied to a bottler with an aluminum foil liner already inserted. A typical induction liner is multilayered. The top layer spaced apart from an opening of the container is generally a paper pulp that is generally spot-glued to the cap. The next layer is wax that is used to bond a layer of aluminum foil to the pulp. The bottom layer is a polymer film laminated to the foil. In existing capping technologies, after the cap or closure is applied to the opening of container, the container passes under an induction coil that emits an oscillating electromagnetic field. As the container passes under the induction coil, the conductive aluminum foil liner begins to heat. The heat melts the wax, which is absorbed into the pulp backing and releases the foil from the cap. The polymer film also heats and flows onto the lip of the container. When cooled, the polymer creates a bond with the container resulting in a hermetically sealed product. While neither the container nor its contents are negatively affected, this process is performed within a few seconds or faster. It is possible to overheat the foil causing damage to the seal layer or any protective barriers. This could result in faulty seals, even weeks after the initial sealing process, In order to detect a defect in sealing, various thermography based systems have been suggested and the systems are most based on processing of thermal image data of cap sealing photographed by an infrared (IR) camera or IR imaging camera.

An existing cap sealing inspection system classifies products into only good products and not good products. However, in an actual inspection, a confidence score is generated in an inspection using a machine learning technique, and even when an ambiguous result having a low confidence score is generated, whether a product is a good product or a not good product is forcedly determined with the low confidence score, which may be problematic. Furthermore, while a defect is simply determined, no information about the type of a defect is provided.

Furthermore, there are two typical problems in the inspection system using machine vision or machine learning. The first problem is that, even when the same inspection algorithm is used, performance of an inspection varies according to the quality or uniformity of a sub-material. As the uniformity of a sub-material is worse, the number of overkills that is a case in which a product is recognized to be not good when the product is actually good and the number of underkills that is a case in which a product is recognized to be good when the product is actually not good increase, or probability of those cases increases. The second problem is that accuracy or accuracy tendency of an inspection remains unknown until an actual inspection is performed. Accordingly, when a new inspection product is to be input, a customer or a user may check inspection accuracy only after a main inspection is performed, which may cause dissatisfaction on the inspection result.

DETAILED DESCRIPTION OF THE INVENTIVE CONCEPT

Technical Problem

The present inventive concept provides an inspection method and apparatus, which may classify products into a user check product by a rejection-process of separating the products, without determining the products to be good products or not good products, when thermal image data with respect to cap sealing of a particular container is analyzed and a low confidence score is obtained.

Furthermore, the present inventive concept provides an inspection method and apparatus, which may provide accurate information for the improvement of a process by previously learning types of not good products and providing accurate information about in which operation of a process line a defect occurred.

Furthermore, the present inventive concept provides an inspection method and apparatus, which may improve confidence of inspection by providing information, by which quality uniformity and inspection accuracy of an object to be inspected are predicted, by using data learned before an actual inspection begins.

Technical Solution

According to an aspect of the present inventive concept, there is provided a method of inspecting cap sealing of a container transferred along a process line, by using an infrared (IR) camera, the method including photographing the cap sealing of the container located within a field of view (FOV) of the IR camera by using the IR camera, calculating a confidence score based on previously learned sample data and thermal image data corresponding to the photographed cap sealing, and comparing the calculated confidence score with a predefined confidence value range, and determining the cap sealing to be one of a good product, a not good product, and a user check product according to a result of the comparison.

In the determining of the cap sealing, when the confidence score is greater than a maximum confidence value of the predefined confidence value range, the cap sealing may be determined to be a good product, when the confidence score is less than a minimum confidence value of the predefined confidence value range, the cap sealing may be determined to be a not good product, and when the confidence score is equal to or greater than the minimum confidence value and equal to or less than the maximum confidence value, the cap sealing may be determined to be a user check product.

The maximum confidence value and the minimum confidence value may be determined by a user's selection.

The method may further include driving classification mechanisms to respectively and separately collect containers determined to be the not good product and the user check product.

The method may further include predicting inspection accuracy of an object to be inspected based on the previously learned sample data, and displaying the predicted inspection accuracy.

The method may further include displaying the thermal image data, the calculated confidence score, and a type of the not good product.

A type of the not good product may include at least one of Overheat, Loosen, Damaged seal, and Underheat, and the previously learned sample data may be learned based on cap sealing of a container corresponding to the good product and cap sealing of a container corresponding to the not good product including at least one of Overheat, Loosen, Damaged seal, and Underheat.

The previously learned sample data may be learned by using any one of a learning base or a feature base.

According to an aspect of the present inventive concept, there is provided a non-transitory computer readable storage medium having stored thereon a program, which when executed by a computer, performs the method of inspecting cap sealing of a container transferred along a process line, by using an IR camera, the method including photographing the cap sealing of the container located within the FOV of the IR camera by using the IR camera, calculating a confidence score based on previously learned sample data and thermal image data corresponding to the photographed cap sealing, and comparing the calculated confidence score with a predefined confidence value range, and determining the cap sealing to be one of a good product, a not good product, and a user check product according to a result of the comparison.

According to an aspect of the present inventive concept, there is provided an apparatus for inspecting cap sealing of a container transferred along a process line, by using an IR camera, the apparatus including an IR camera photographing the cap sealing of the container located within the FOV of the IR camera, and a controller calculating a confidence score based on previously learned sample data and thermal image data corresponding to the photographed cap sealing, comparing the calculated confidence score with a predefined confidence value range, and determining the cap sealing to be one of a good product, a not good product, and a user check product according to a result of the comparison.

The controller may determine the cap sealing to be a good product when the confidence score is greater than a maximum confidence value of the predefined confidence value range, determine the cap sealing to be a not good product when the confidence score is less than a minimum confidence value of the predefined confidence value range, and determine the cap sealing to be a user check product when the confidence score is equal to or greater than the minimum confidence value and equal to or less than the maximum confidence value, The maximum confidence value and the minimum confidence value may be determined by a user's selection.

The apparatus may further include a first collection box collecting the not good product, a second collection box collecting the user check product, and a first classification mechanism pushing the not good product toward the first collection box and a second classification mechanism pushing the user check product toward the second collection box, the first and second classification mechanisms being provided in a classification session next to an inspection session of the process line, in which the controller drives the first classification mechanism or the second classification mechanism so that containers determined to be the not good product and the user check product are respectively and separately collected in the first collection box and the second collection box.

The apparatus may further include a display portion displaying the thermal image data, the calculated confidence score, and a type of the not good product, in which the controller predicts inspection accuracy of an object to be inspected based on the previously learned sample data and displays the predicted inspection accuracy on the display portion.

A type of the not good product may include at least one of Overheat, Loosen, Damaged seal, and Underheat, and the previously learned sample data may be learned based on cap sealing of a container corresponding to the good product and cap sealing of a container corresponding to the not good product including at least one of Overheat, Loosen, Damaged seal, and Underheat.

Advantageous Effects

To address the above problem of the related art, according to an embodiment of the present inventive concept, products may be classified into a user check product by a rejection-process of separating the products, without determining the products to be good products or not good products, when thermal image data with respect to cap sealing of a particular container is analyzed and a low confidence score is obtained.

Furthermore, accurate information for the improvement of a process may be provided by previously learning types of not good products and providing accurate information about in which operation of a process line a defect occurred.

Furthermore, confidence of inspection may be improved by providing information, by which quality uniformity and inspection accuracy of an object to be inspected are predicted, by using data learned before an actual inspection begins.

DESCRIPTION OF THE DRAWINGS

FIGS. 30A-30F are exemplary views for explaining inspection accuracy prediction according to another embodiment.

FIGS. 31A-31G are exemplary views for explaining inspection accuracy prediction according to another embodiment.

BEST MODE

Figure 1:
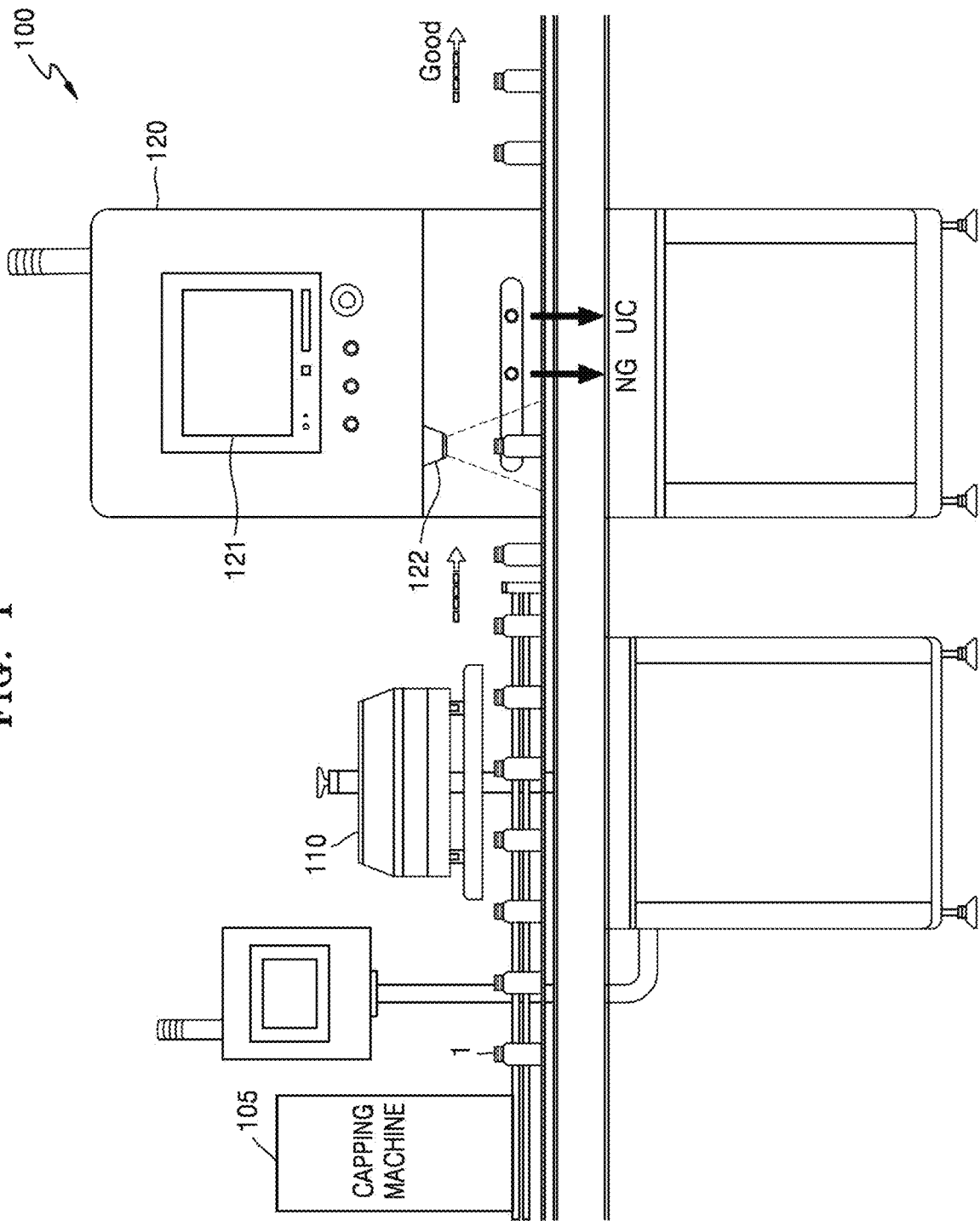
FIG. 1 is a schematic view of an overall system according to an embodiment.

As the inventive concept allows for various changes and numerous embodiments, embodiments will be illustrated in the drawings and described in detail in the written description. However, this is not intended to limit the present inventive concept to particular modes of practice, and it is to be appreciated that various modifications, equivalents, and/or alternatives that do not depart from the spirit and technical scope of the present inventive concept are encompassed in the present inventive concept. Like reference numerals refer to like elements throughout the specification regarding the description of the drawings.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the present specification, the expressions such as "A or B," "at least one of A and/or B," or "at least one or more of A and/or B" may include all available combinations of items listed together. For example, the expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements regardless of an order and/or importance and to distinguish one constituent element from another constituent element, but the constituent elements are not limited by the terms. For example, a first user device and a second user devise may denote different user devices regardless of an order and/or importance. For example, without departing from the right scope of the present inventive concept, a first constituent element may be referred to as a second constituent element, and vice versa.

In the present specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween. Other expressions, such as, "between" and "directly between", describing the relationship between the constituent elements, may be construed in the same manner.

In the present specification, the expression "configured to" may be interchangeable with an expression such as "suitable for", "having the capacity to", "designed to", "adapted to", "made to", or "capable of". The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify an exclusive processor, for example, an embedded processor, for performing the functions or a generic-purpose processor, for example, a central processing unit (CPU) or an application processor (AP), capable of performing the functions by executing one or more software programs stored in a memory device.

The terms used in the present inventive concept have been selected from currently widely used general terms in consideration of the functions in the present inventive concept. However, the terms may vary according to the intention of one of ordinary skill in the art, case precedents, and the advent of new technologies. Also, for special cases, meanings of the terms selected by the applicant are described in detail in the description section. Accordingly, the terms used in the present inventive concept are defined based on their meanings in relation to the contents discussed throughout the specification, not by their simple meanings.

FIG. 1 is a schematic view of an overall system 100 according to an embodiment.

Referring to FIG. 1, the overall system 100 may include a capping machine 105 for attaching a cap on a container 1 that is transferred along a process line, a sealing machine 110 for hermetically sealing the cap that is attached or placed on the container 1, and an inspection apparatus 120 for inspecting cap sealing of the transferred container. The inspection apparatus 120 according to the present embodiment may include a display or display portion 121 and an infrared (IR) camera 122. The inspection apparatus 120 may further include a multi-rejection structure that allows the container 1 determined to be a good product to continuously proceed along the process line, separately collects the container 1 determined to be a not good product in a collection box corresponding to Not Good (NG), and separately collects the container 1 determined to be a user check product in a collection box corresponding to User Check (UC). The multi-rejection structure may be described later with reference to FIG. 2.

The good product, the not good product, and the user check product are determined by previously learning cap sealing of the container 1 according to the types of a good product and a not good product and, during an actual inspection, comparing thermal image data of the container 1 photographed by the IR camera 122 with the previously learned data, thereby classifying the products into the good product and the not good product. Furthermore, when the above operation is performed based on data learned by using machine learning, the operation may be expressed by confidence scores and the good product, the not good product, and the user check product are determined based on a predefined confidence value range. In other words, as a result of analysis of thermal image data of a current inspection product, when the confidence value thereof is greater than the maximum confidence value, the current inspection product is determined to be a good product, when the confidence value thereof is less than the minimum confidence value, the current inspection product is determined to be a not good product, and when the confidence value thereof is between the maximum confidence value and the minimum confidence value, the current inspection product is determined to be a user check product. In other words, when the confidence value is ambiguous, the current inspection product is separately classified and processed by user check, rather than forcedly determined to be a good product or a not good product with a low confidence score.

Furthermore, the inspection apparatus 120 according to the present embodiment may predict inspection accuracy of cap sealing of a particular container through a setting process, before performing an actual inspection. For example, the predicted inspection accuracy may be notified to a user by predicting the inspection accuracy according to a result of the previous learning based on the types of a good product and a not good production.

The capping machine 105 places a cap on the container 1 transferred along the process line. The sealing machine 110 may be a high frequency heat inducing (HFHI) unit.

The container 1 passing through the sealing machine 110 is transferred to the inspection apparatus 120 and is located within a field of view (FOV) of the IR camera 122. Under the control of the inspection apparatus 120, the cap sealing of the container 1 is photographed by the IR camera 122, the photographed cap sealing is image-processed to generate thermal image data, and the thermal image data is displayed on the display portion 121. Furthermore, the inspection apparatus 120 compares the thermal image data with the previously learned data and determines whether the cap sealing corresponding to the thermal image data is a good product, a not good product, or a user check product. Furthermore, even when the cap sealing is determined to be a not good product, the inspection apparatus 120 may display on the display portion 121 a type of defect, for example, "Overheat", "Loosen", "Damaged seal", or "Underheat". Accordingly, it is possible to check in which process line of the entire process of the cap sealing of a container, for example, the capping machine 105 or the sealing machine 110, an error occurred.

To increase confidence of the IR camera 122 according to a temperature change, the inspection apparatus 120 according to the present embodiment may locate a temperature sensor within the FOV of the IR camera 122, perform a comparison operation between a value of the temperature sensor and a temperature value calculated from thermal image data obtained by photographing the temperature sensor, and notify a user of temperature calibration and inspection environment of the IR camera 122.

The IR camera may include a cooled type or an uncooled type. A cooled type IR camera is generally sensitive to a wavelength range of about 1 µm to about 5 µm. An uncooled type IR camera is generally sensitive to a wavelength range of about 7 µm to about 13 µm. Factory calibration of an IR camera is performed by a manufacturer. In this process, the IR camera has a calibration table or a calibration file suitable for a particular temperature range.

Figure 2:
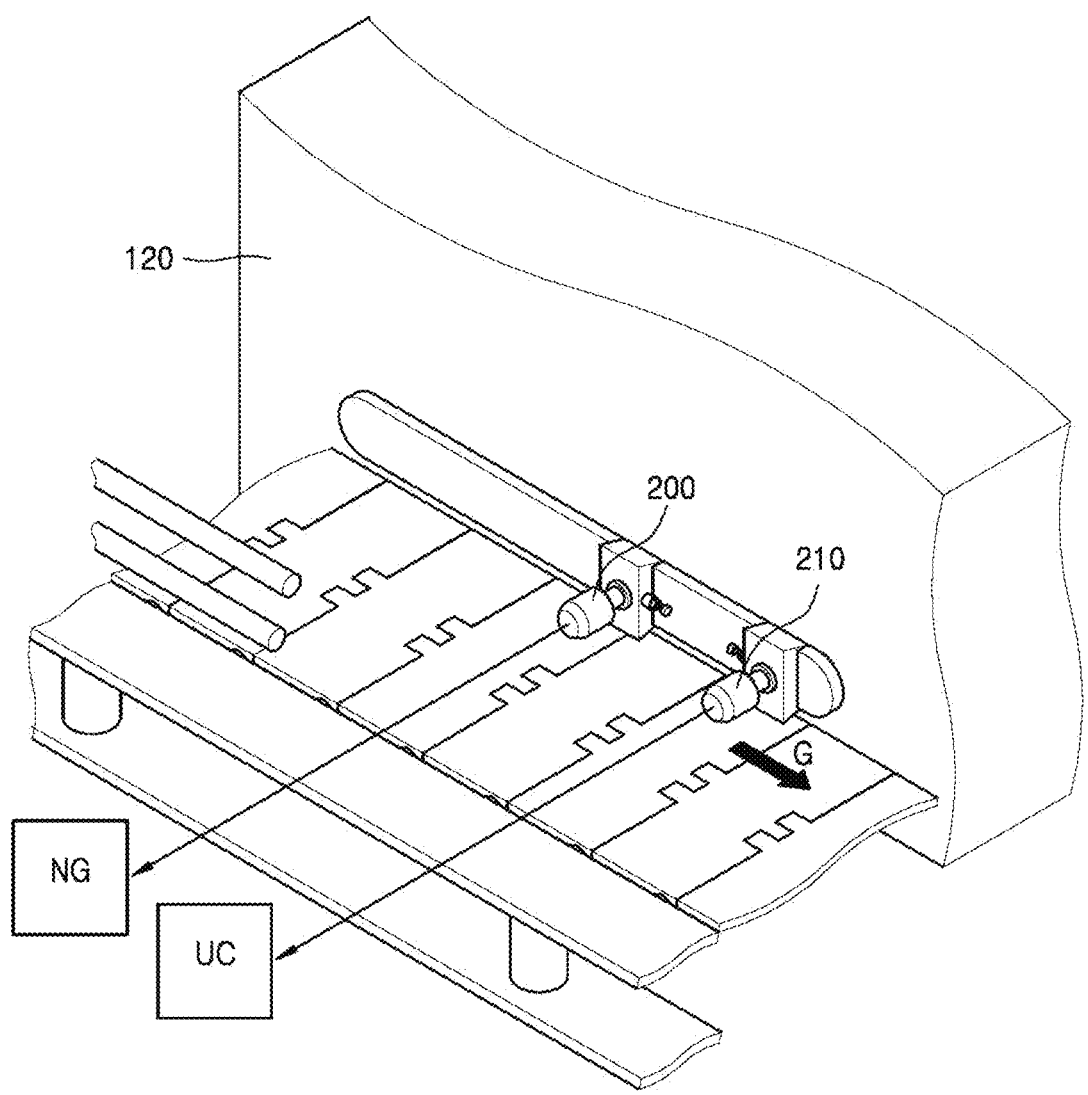
FIG. 2 is a schematic perspective view of a structure for multi-rejection of an inspection apparatus illustrated in FIG. 1.

FIG. 2 is a schematic perspective view of a structure for multi-rejection of the inspection apparatus 120 of FIG. 1.

Referring to FIG. 2, the inspection apparatus 120 photographs cap sealing of a container transferred along a process line, by using an IR camera, and calculates a confidence score based on sample data previously learned based on photographed thermal image data. The inspection apparatus 120 compares the confidence score with a predefined confidence value range and determines the cap sealing to be a good product, a not good product, or a user check product according to a result of the comparison.

As illustrated in FIG. 2, the inspection apparatus 120 allows the container determined to be a good product to continuously proceed along the process line and separates the container determined to be a not good (NG) product from the process line by driving a first classification mechanism 200 to have the separated container collected in an NG collection box. Furthermore, the inspection apparatus 120 separates the container determined to be a user check (UC) product from the process line by driving the first classification mechanism 200 to have the separated container collected in a UC collection box.

The inspection apparatus 120 according to the present embodiment may calculate the confidence score with respect to the cap sealing of a container to be inspected based on the learned sample data, set a confidence range in which the confidence score is constant, for example, a minimum confidence value and a maximum confidence value, and determine the inspected container to be a good product when the calculated confidence score is greater than the maximum confidence value, the inspected container to be a not good product when the calculated confidence score is less than the minimum confidence value, and the inspected container to be a user check product when the calculated confidence score is between the minimum confidence value and the maximum confidence value, without determining the container to be a good product or a not good product. In other words, since the inspection apparatus 120 embodies a multi-rejection structure, probability of making an incorrect decision may be reduced. The above structure may perform an appropriate inspection process when data in the form different from the previously learned data is input.

Figure 3:
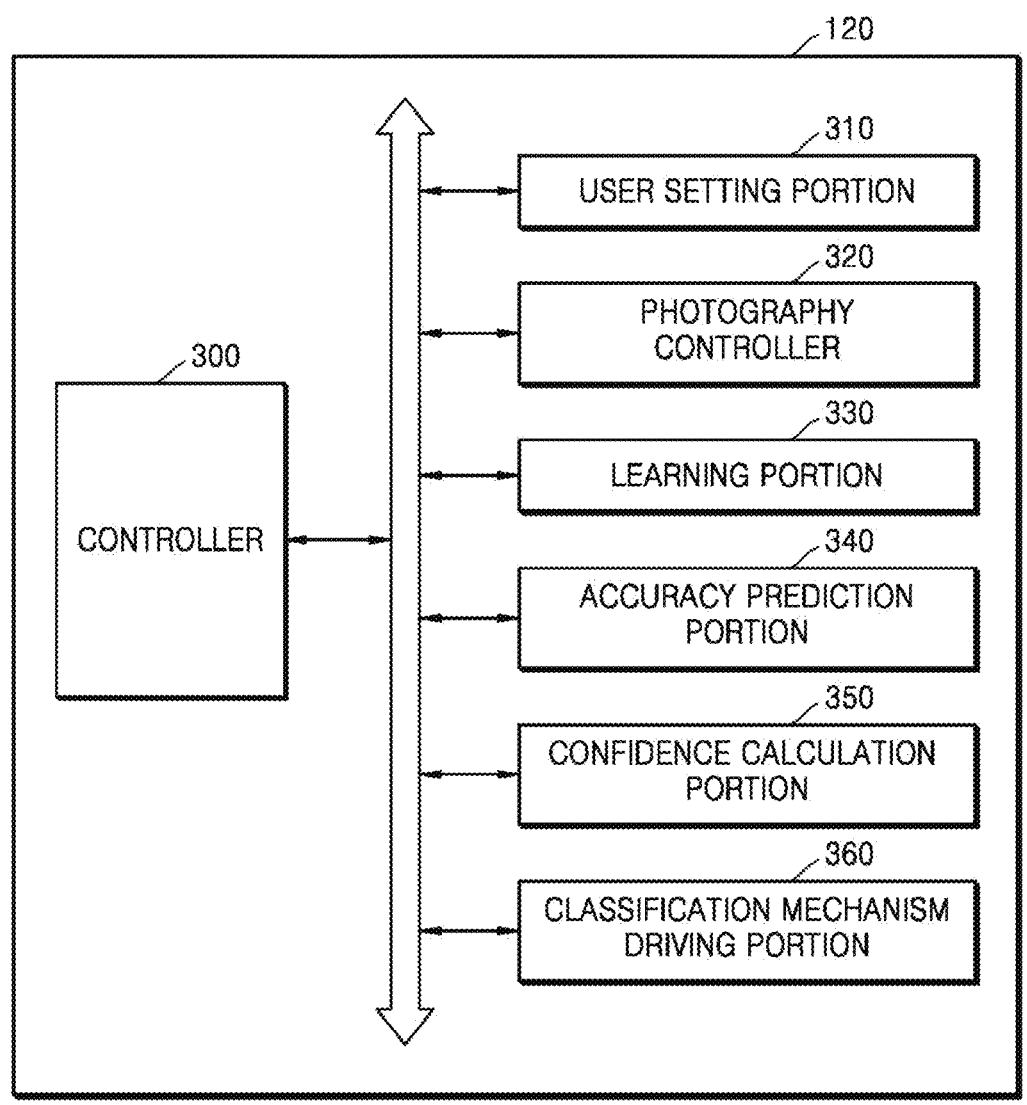
FIG. 3 is a schematic block diagram of the inspection apparatus of FIG. 1.

FIG. 3 is a schematic block diagram of the inspection apparatus 120 of FIG. 1.

Referring to FIG. 3, the inspection apparatus 120 may include a controller 300, a user setting portion 310, a photography controller 320, a learning portion 330, an accuracy prediction portion 340, a confidence calculation portion 350, and a classification mechanism driving portion 360.

Furthermore, the inspection apparatus 120 may further include the display portion 121, the IR camera 122, and the first and second classification mechanisms 200 and 210, which are illustrated in FIGS. 1 and 2. Furthermore, although the internal elements of the inspection apparatus 120 are separately described with reference to FIG. 3, the present disclosure is not limited thereto and the functions of the internal elements may be integrally processed by the controller 300, a processor, or a central processing unit (CPU).

The controller 300 may control the overall operation of the inspection apparatus 120.

The user setting portion 310 sets an environment and a necessity setting value of the inspection apparatus 120. For example, a user input may be set through a touch interface of the display portion 121 illustrated in FIG. 1. An operation menu of the inspection apparatus 120, for example, capture for an actual inspection, teaching for sample data learning, or prediction for inspection accuracy prediction, may be selected through the user setting portion 310. Furthermore, according to the present embodiment, a range of a confidence value may be set, and the range of a confidence value may be set according to the type of each not good product. Furthermore, in a learning menu, deep learning or feature based learning may be selected for learning, and a learning method having a high confidence value may be selected according to a result of each learning method.

The photography controller 320 controls the IR camera 122 to photograph the cap sealing of a container located within the FOV.

The learning portion 330 learns a good product and not good products according to types with respect to the cap sealing of a container. The types of defects of a not good product may include "Overheat", "Loosen", "Damaged seal", or "Underheat", but not limited thereto. The inspection apparatus 120 according to the present embodiment may perform learning for each type or class based on supervised learning in a sealed packaging container inspection system, and provide information for the improvement of a process based on the learning.

In detail, images of samples are captured and, during capture, a class tag is stored in the captured files previously selected according to each class, to interact with a file name or a separate list file. The supervised learning is performed by using files with a class tag. The supervised learning may use a general machine learning technique or algorithm. For example, although artificial neural network (ANN), correlated neural network (CNN), or deep neural network (DNN) may be used, the present disclosure is not limited thereto.

After learning the types of a not good product, information about the improvement of a process may be provided for each type of a defect during an actual inspection. For example, a user or an operator may be notified of a defect "Loosen" for a setting error of the capping machine 105, a defect "Overheat" for a setting error of the sealing machine 110, a defect "Underheat" for a setting error of the sealing machine 110, and a defect "Damaged seal" for a quality error of a container, a seal, or a cap.

In the method of providing information about the improvement of a process, the supervised learning begins with N-number of sample classes and the supervised learning is terminated. When an actual inspection begins, a confidence score with respect to the N-number of sample classes is calculated and the confidence score is displayed. Information corresponding to a process with respect to a class having a high confidence score is displayed.

FIGS. 4 to 16 are exemplary views for explaining learning of the types of a good product and a not good product.

Figure 4:
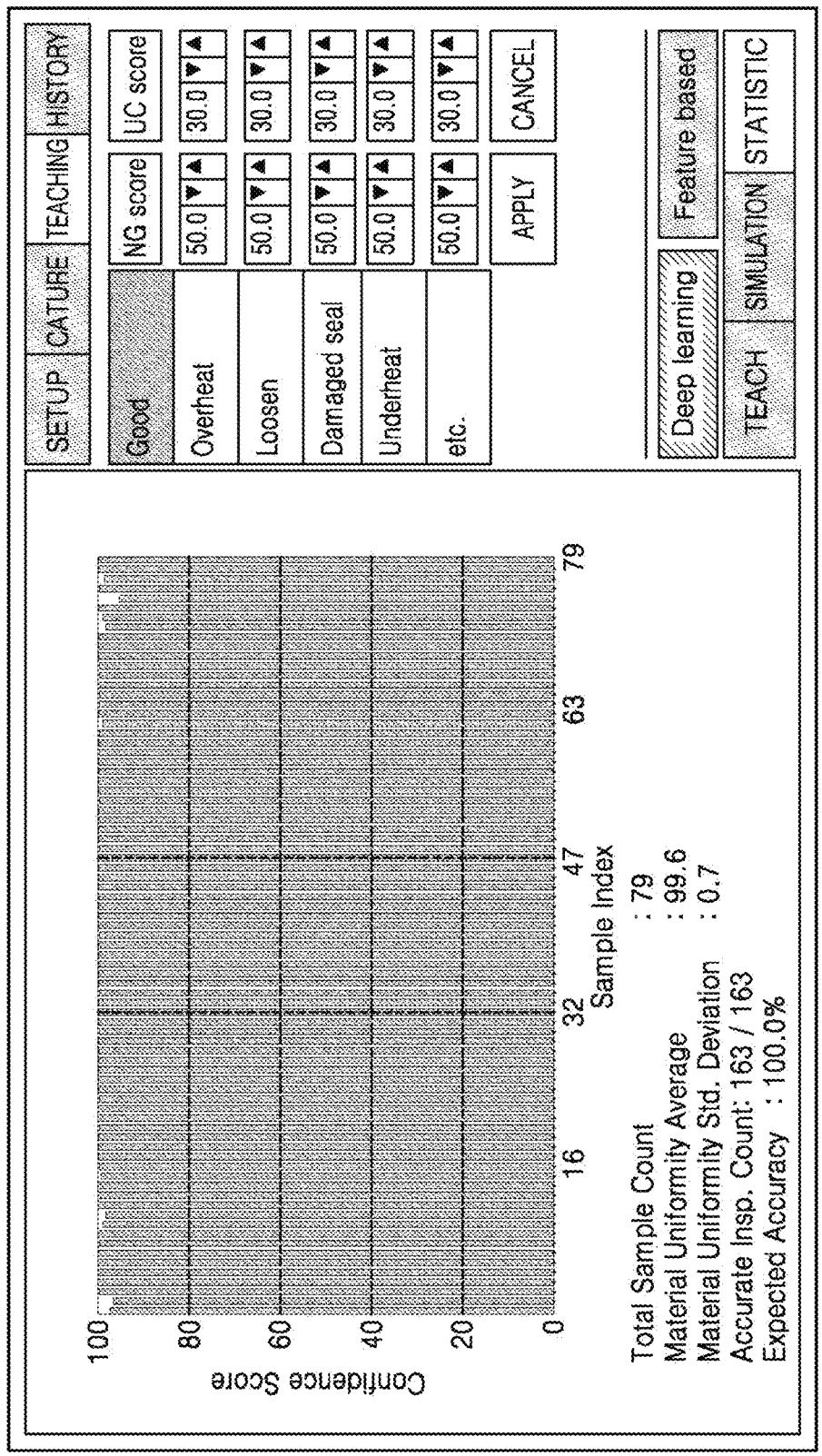
FIGS. 4 to 16 are exemplary views for explaining learning of the types of a good product and a not good product.
Figure 5:
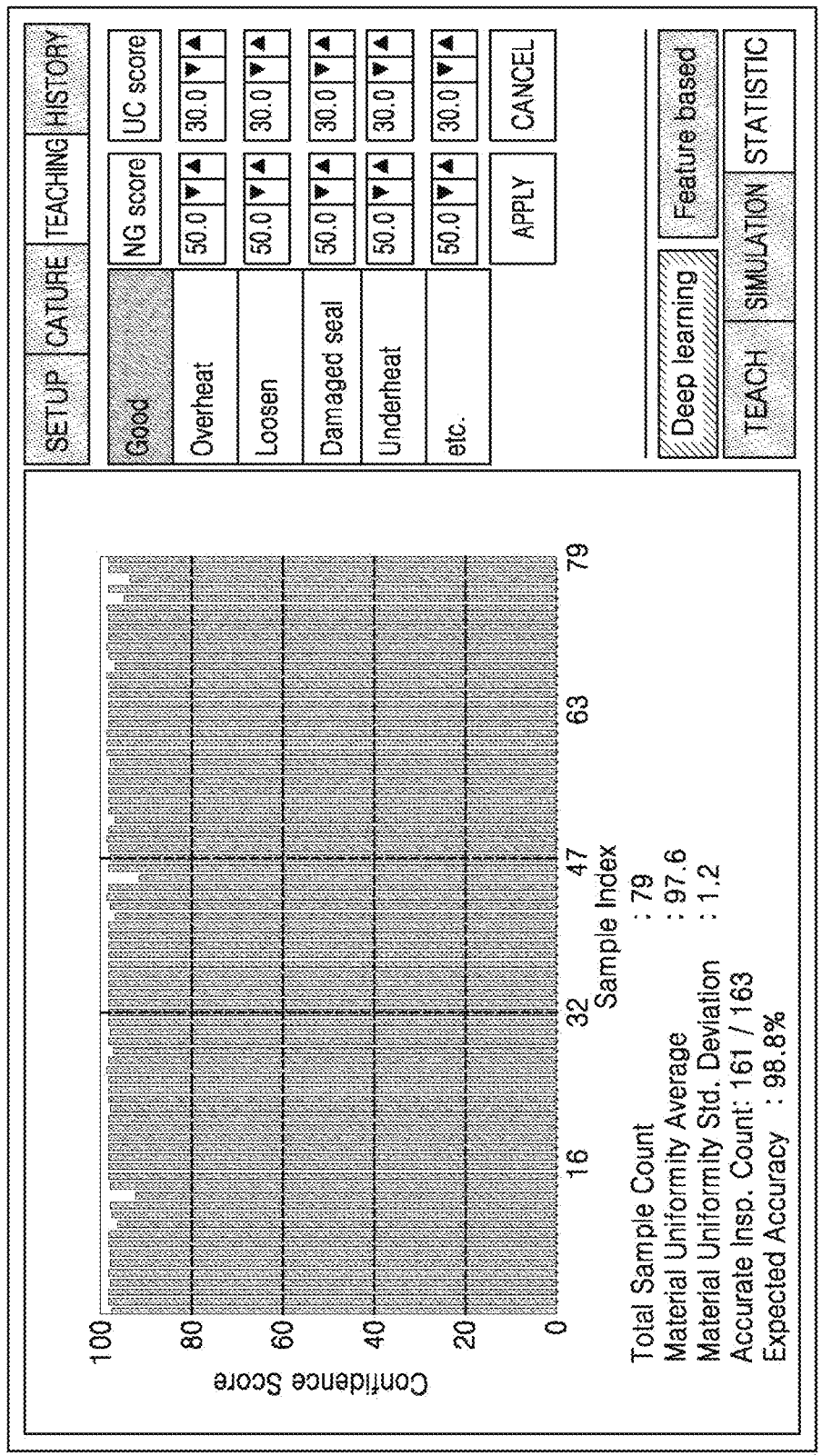

Referring to FIG. 4, a result of performing deep learning on seventy-nine (79) samples of a good product is illustrated, in which the horizontal axis indicates the number of samples and the vertical axis indicates the confidence value. The average of quality uniformity is 99.6, the standard deviation is 0.7, and one hundred sixty-three (163) times of one hundred sixty-three (163) inspections are determined to be a good product so that predicted inspection accuracy is 100%. Referring to FIG. 5, a result of performing feature-based learning on the same seventy-nine (79) samples of a good product is illustrated. The average of quality uniformity is 97.6, the standard deviation is 1.2, and one hundred sixty-one (161) times of one hundred sixty-three (163) inspections are determined to be a good product so that predicted inspection accuracy is 98.8%.

Figure 6:
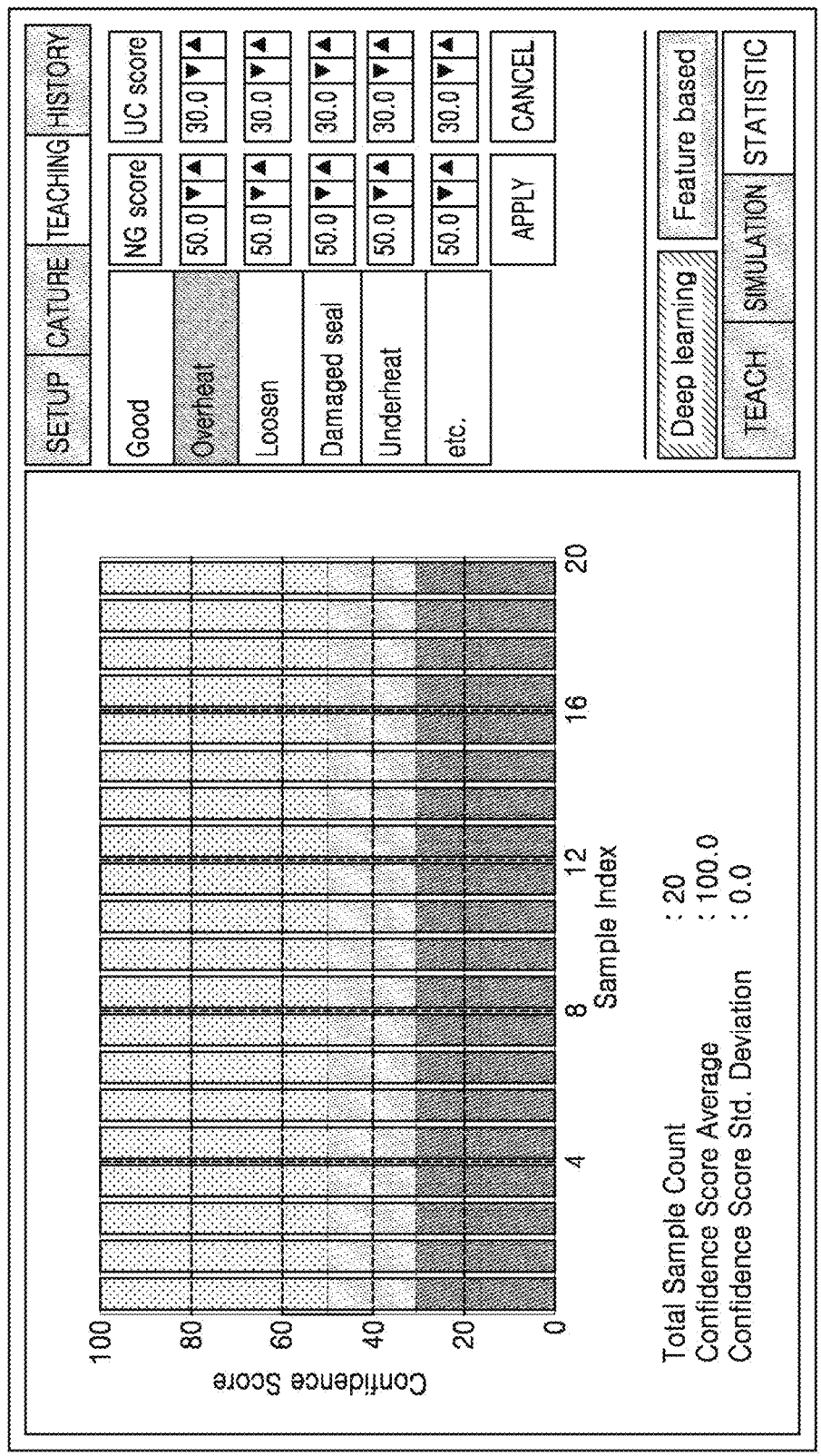
Figure 7:
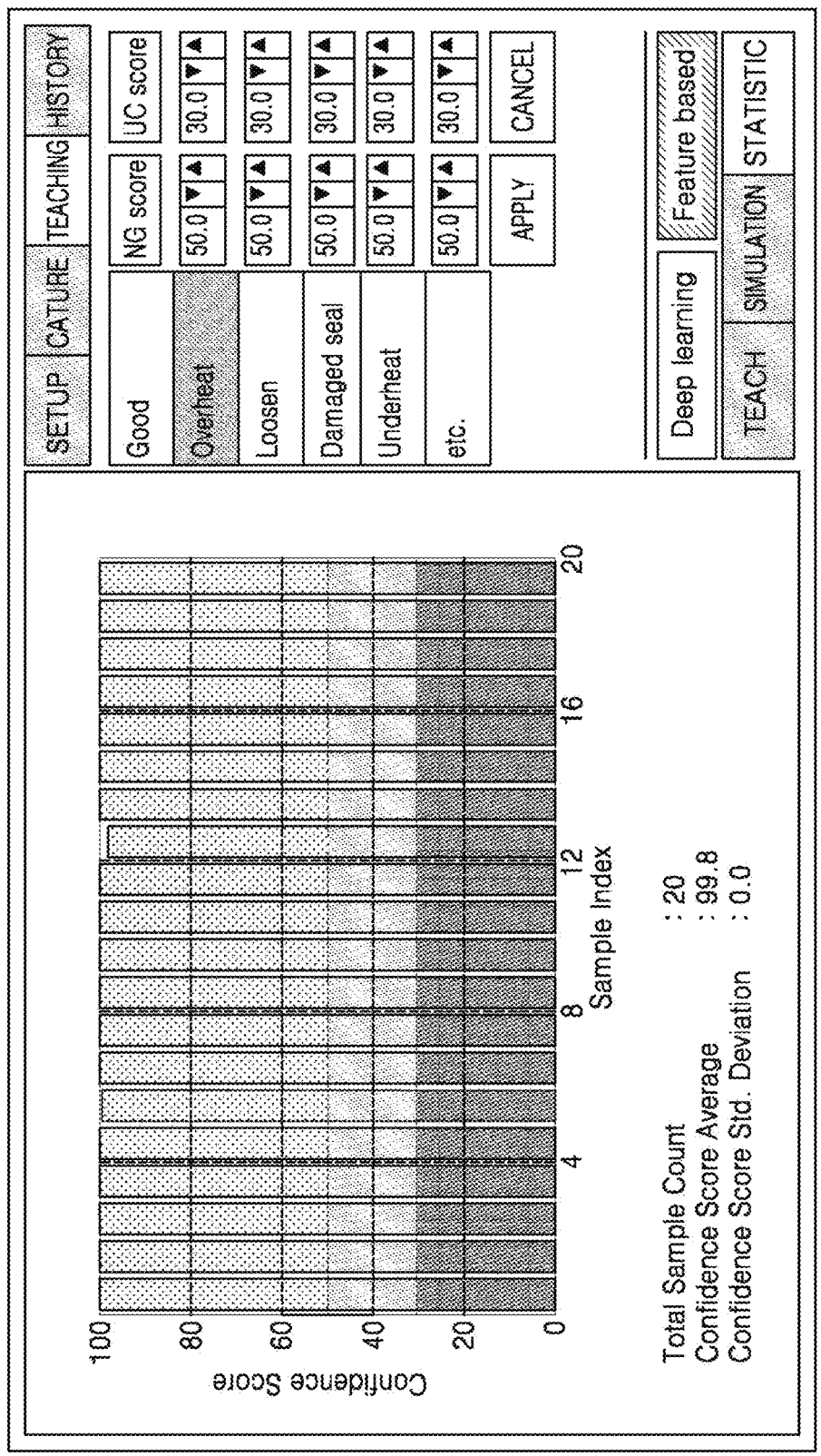
Figure 8:
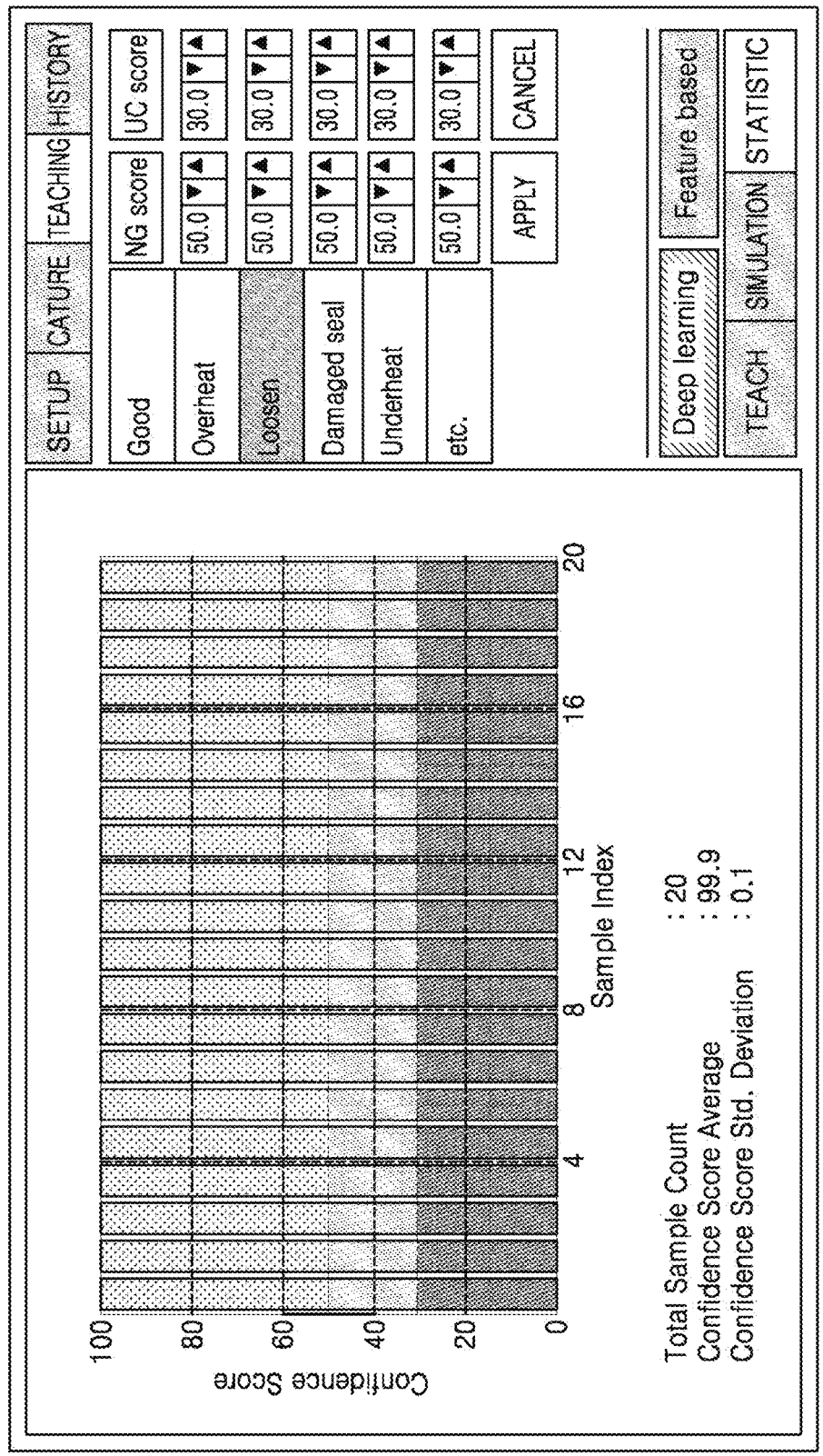
Figure 9:
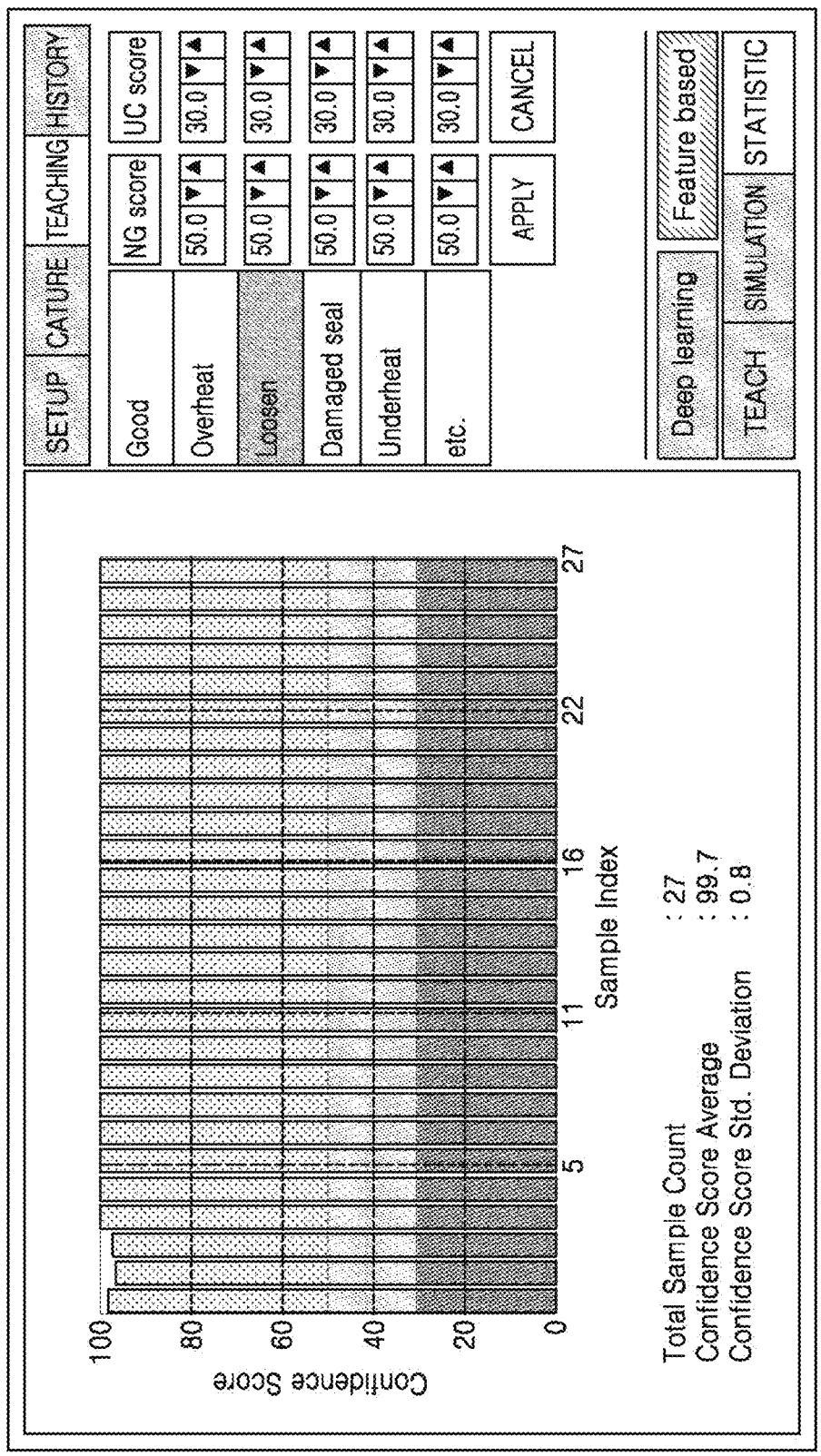
Figure 10:
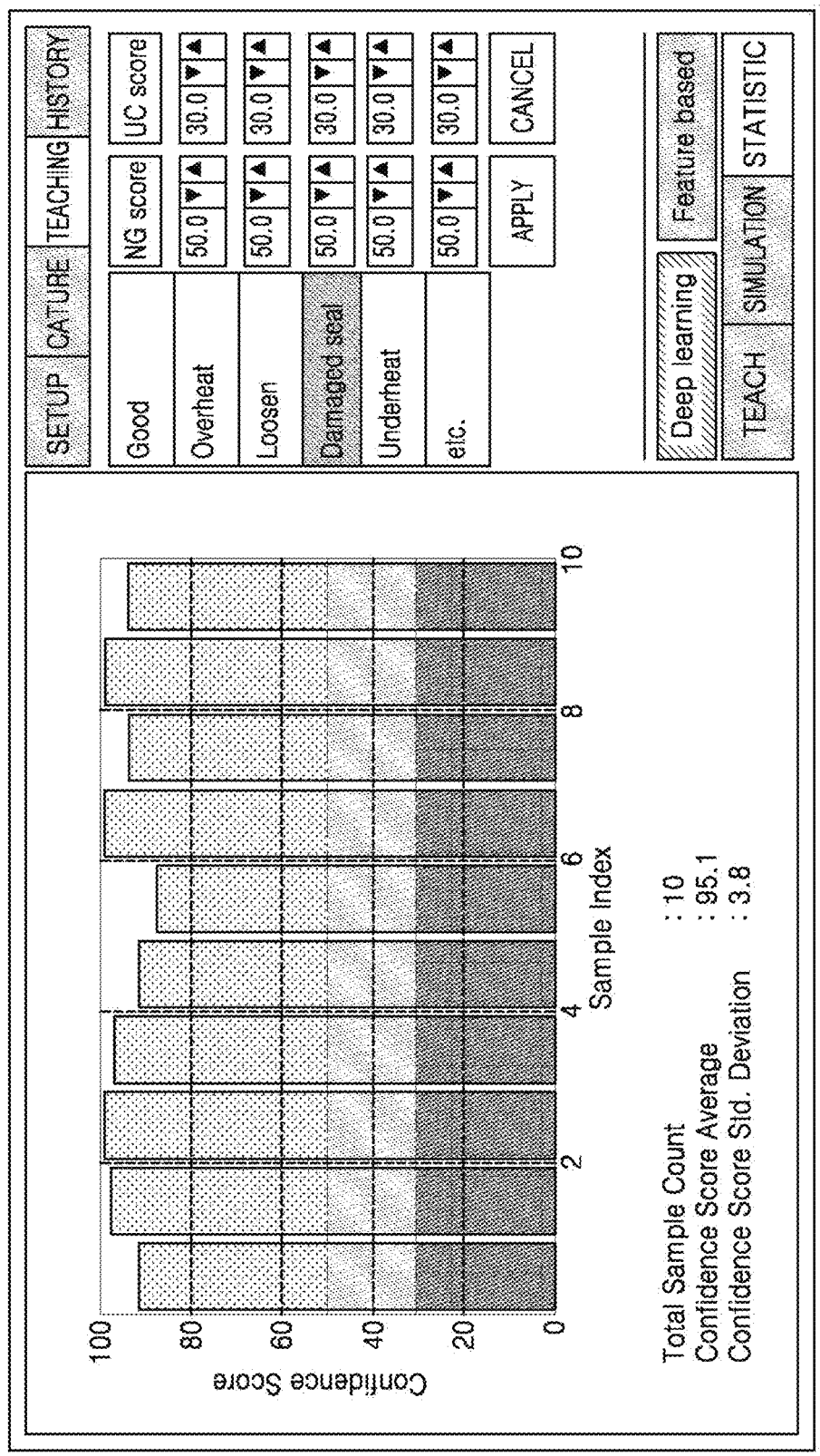
Figure 11:
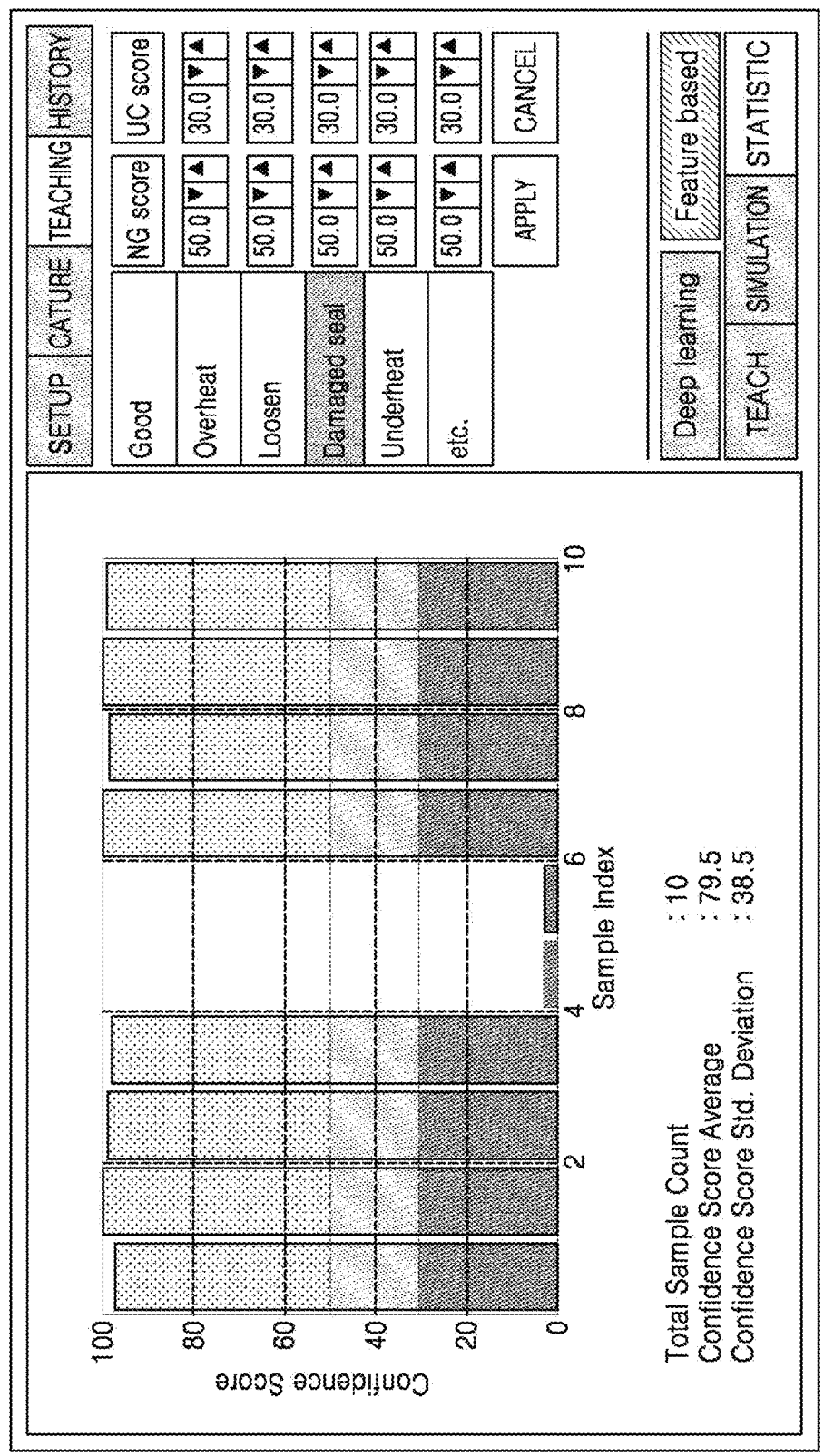
Figure 12:
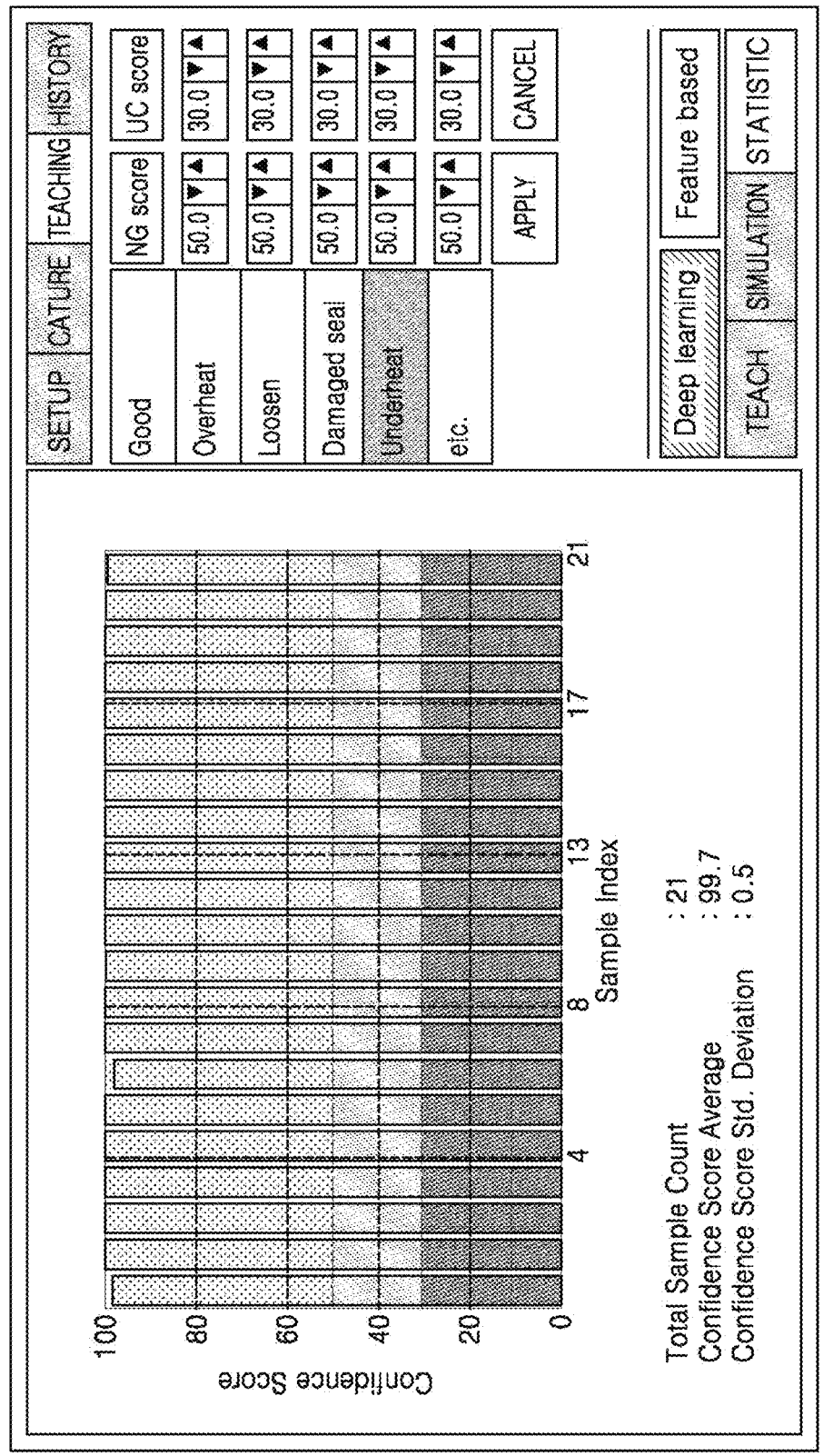
Figure 13:
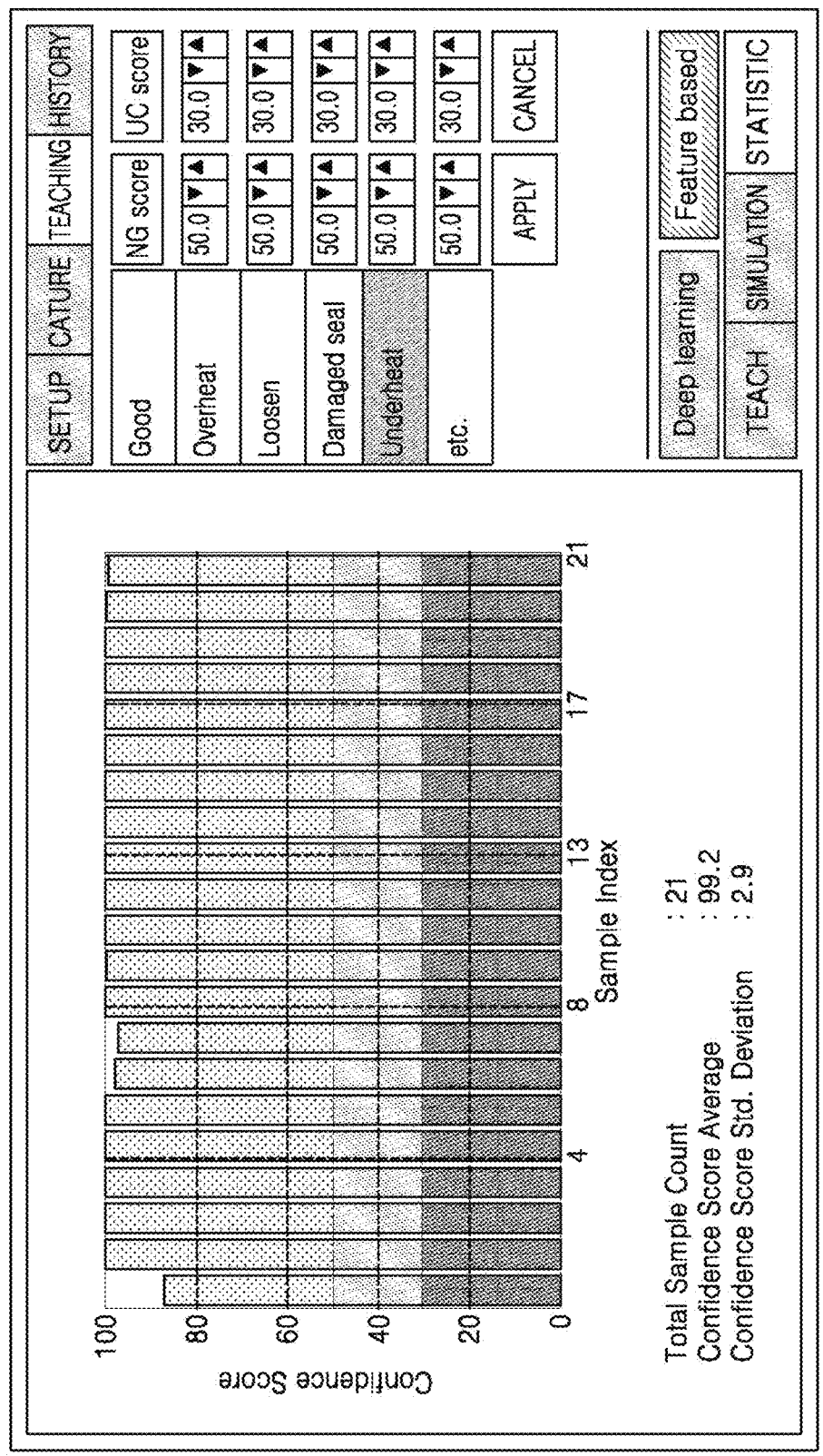
Figure 14:
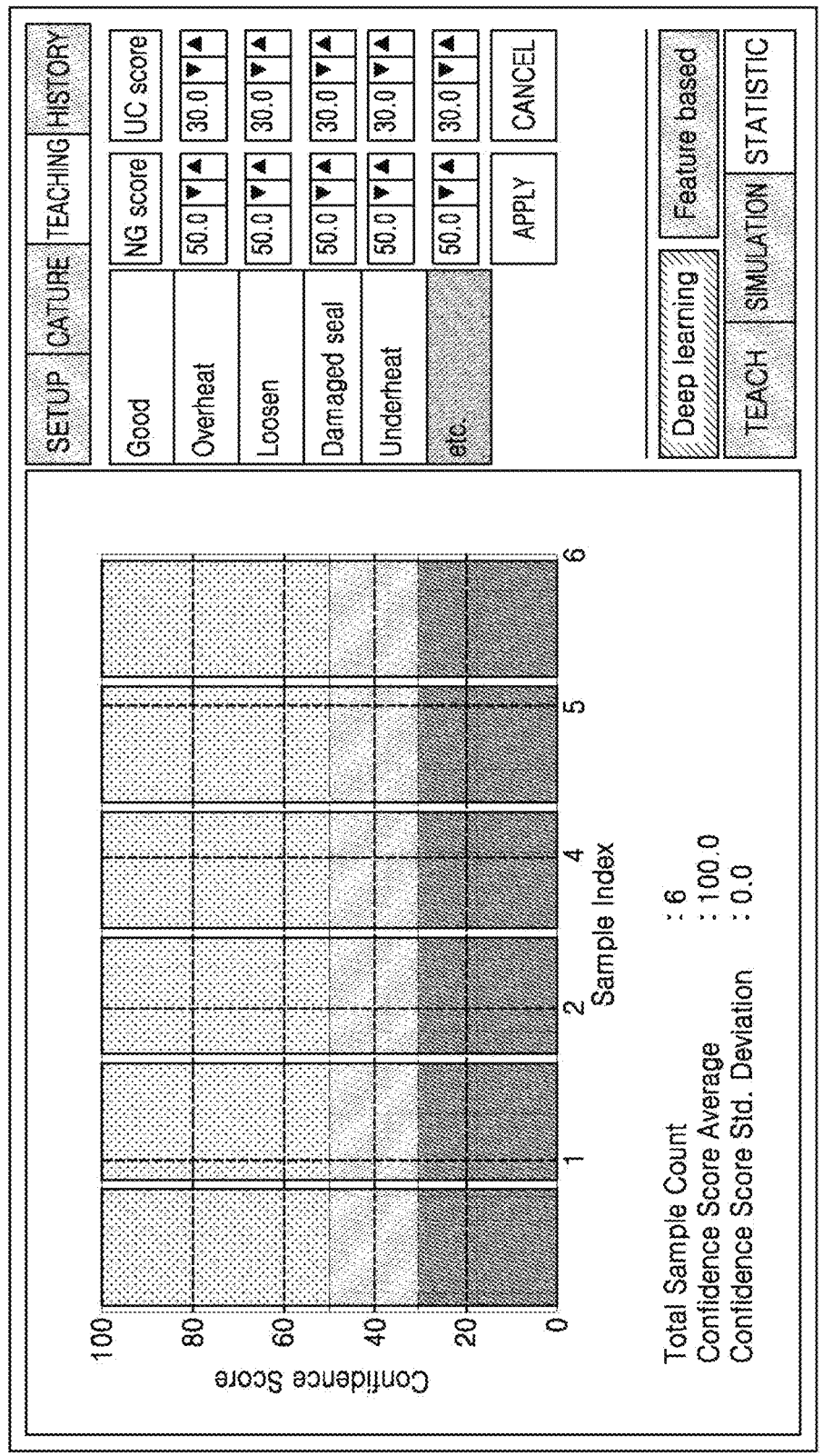
Figure 15:
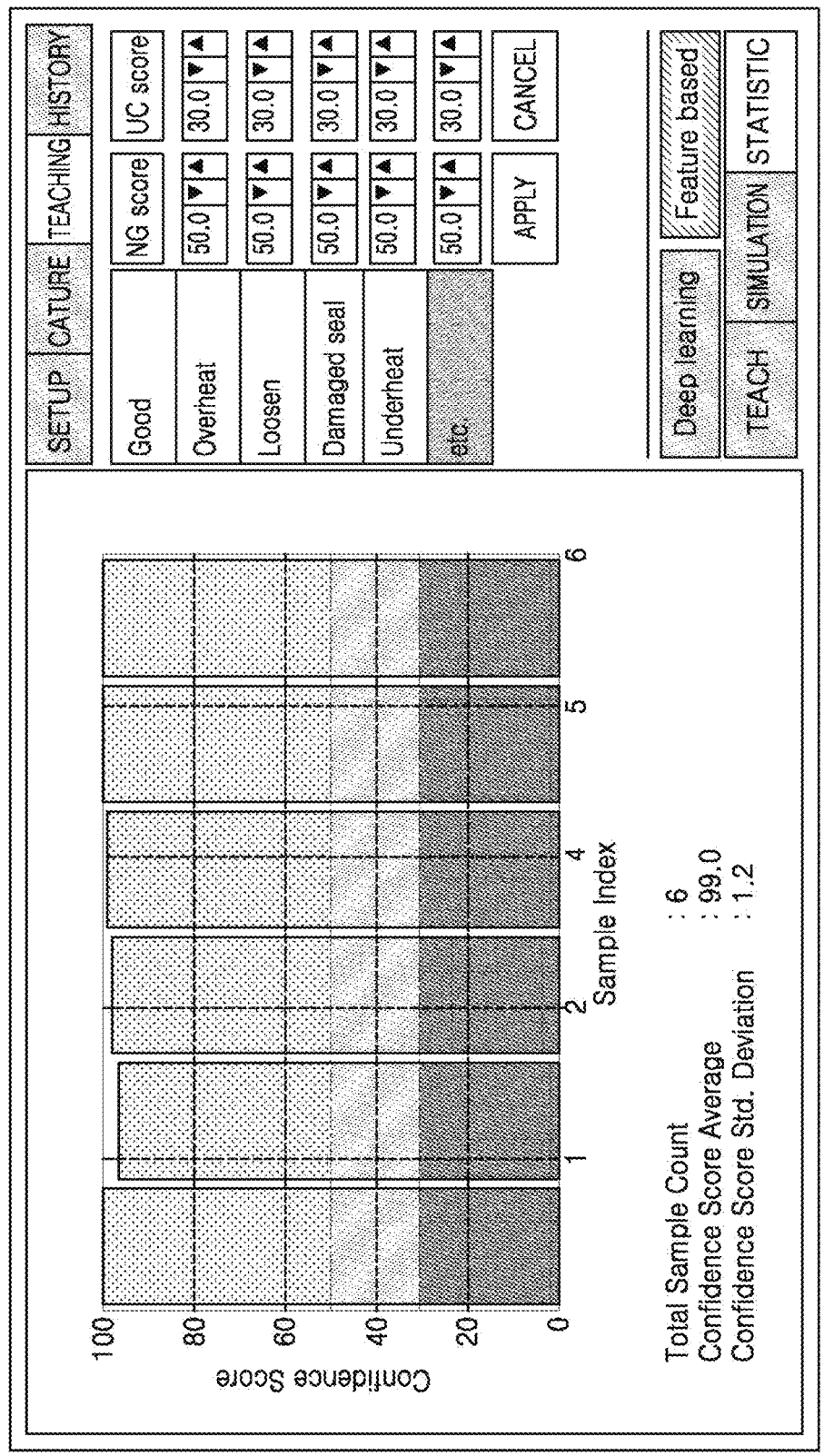

Referring to FIGS. 6 and 7, a result of performing deep learning and feature-based learning on twenty (20) Overheat samples among the types of a not good product is illustrated. FIGS. 8 and 9 illustrate a result of performing deep learning and feature-based learning on twenty-seven (27) Loosen samples among the types of a not good product. FIGS. 10 and 11 illustrate a result of performing deep learning and feature-based learning on ten (10) Damaged seal samples among the types of a not good product. FIGS. 12 and 13 illustrate a result of performing deep learning and feature-based learning on twenty-one (21) Underheat samples among the types of a not good product. FIGS. 14 and 15 illustrate a result of performing deep learning and feature-based learning on six (6) etc. samples among the types of a not good product.

Figure 16:
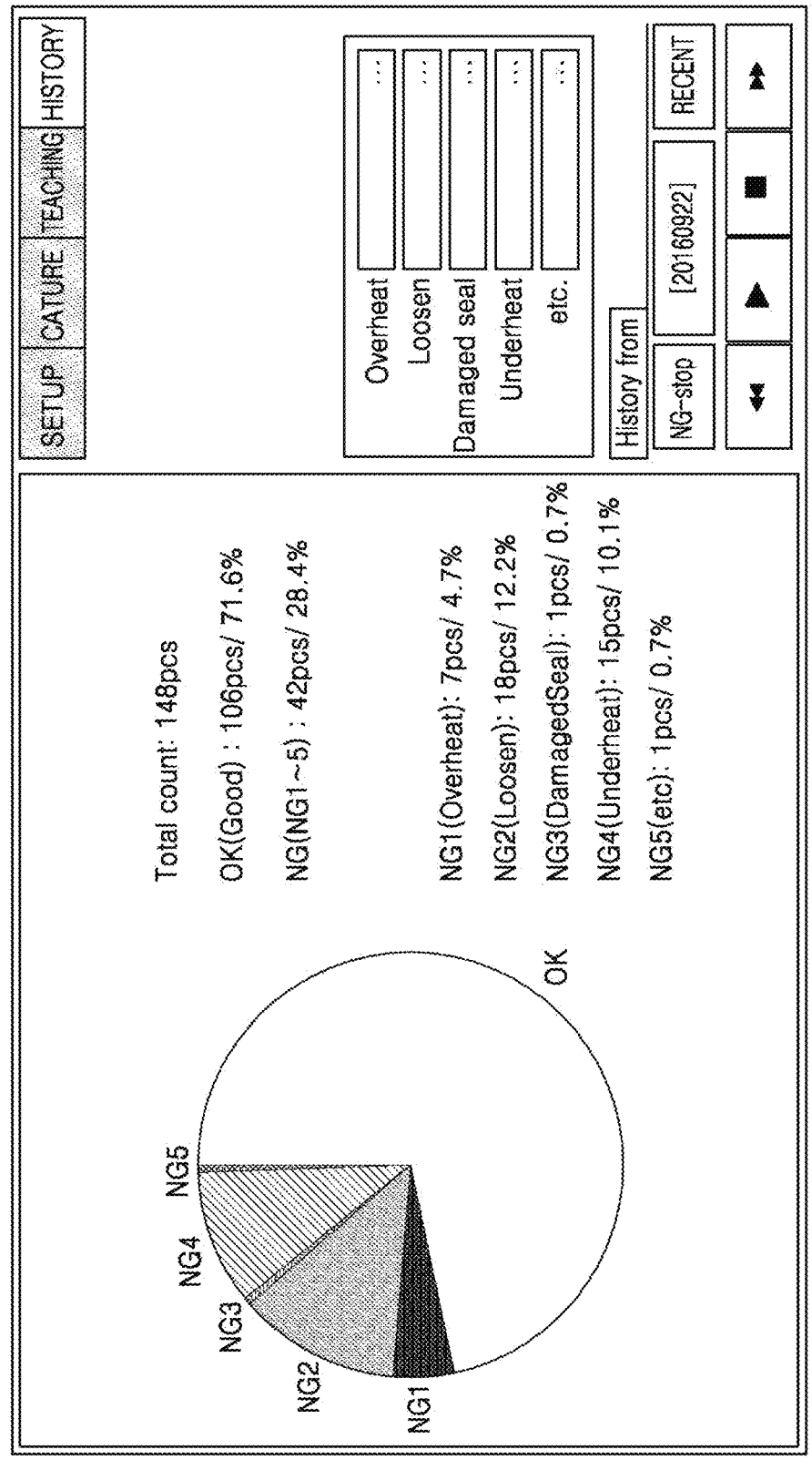
Figure 17:
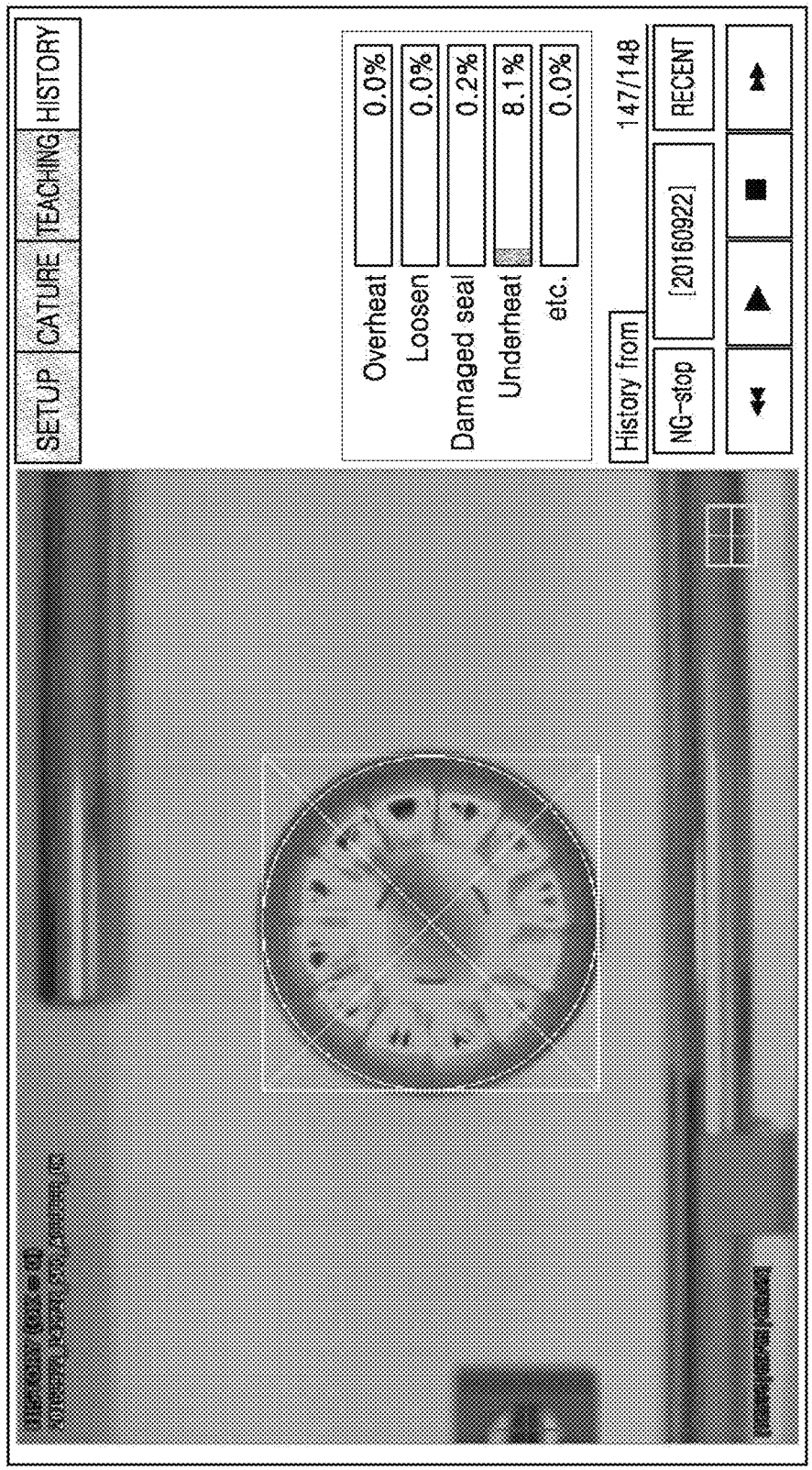
FIGS. 17 to 28 are exemplary views for explaining determining the types of a good product and a not good product with respect to cap sealing of a container based on learned data.
Figure 18:
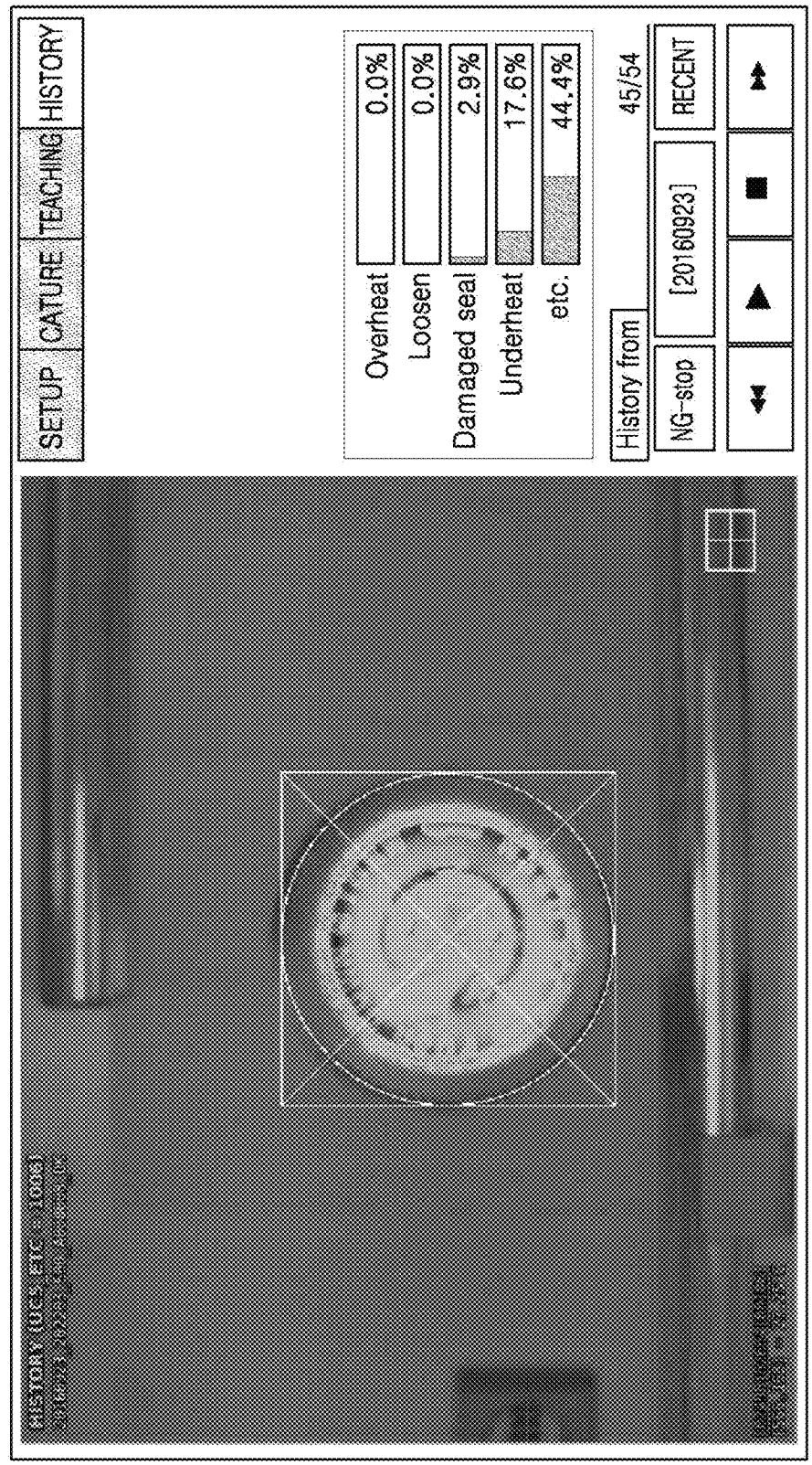
Figure 19:
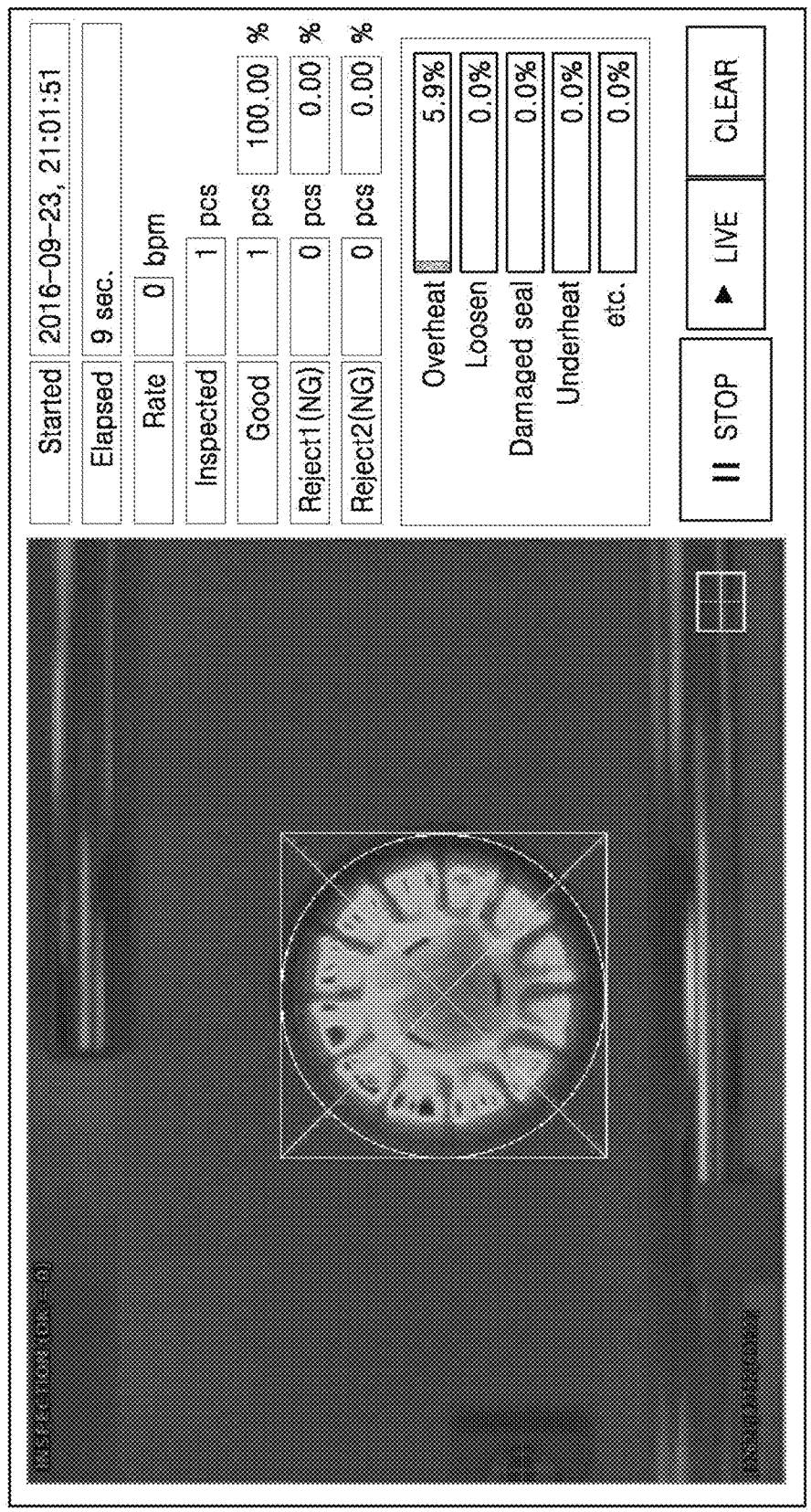
Figure 20:
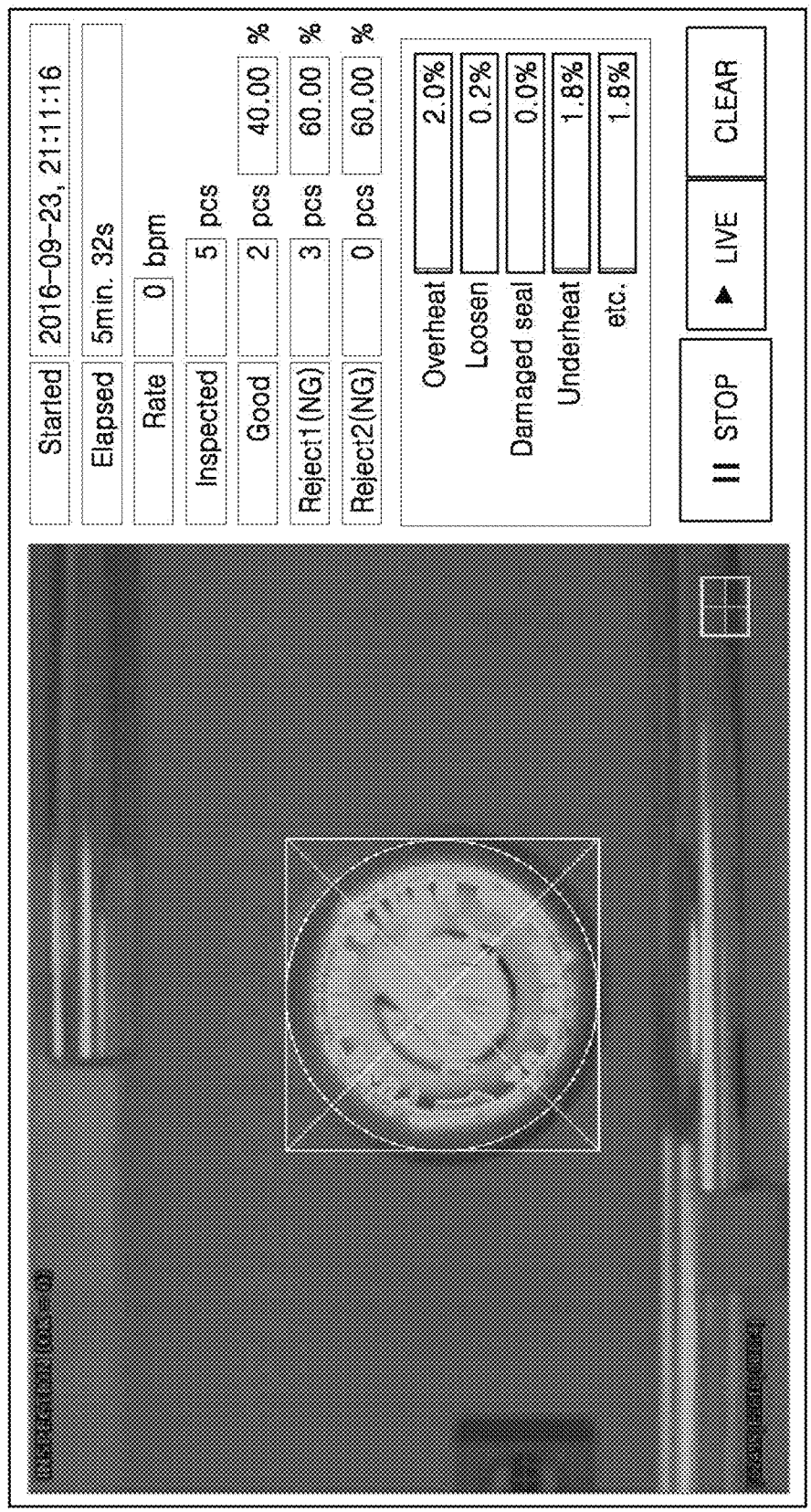
Figure 21:
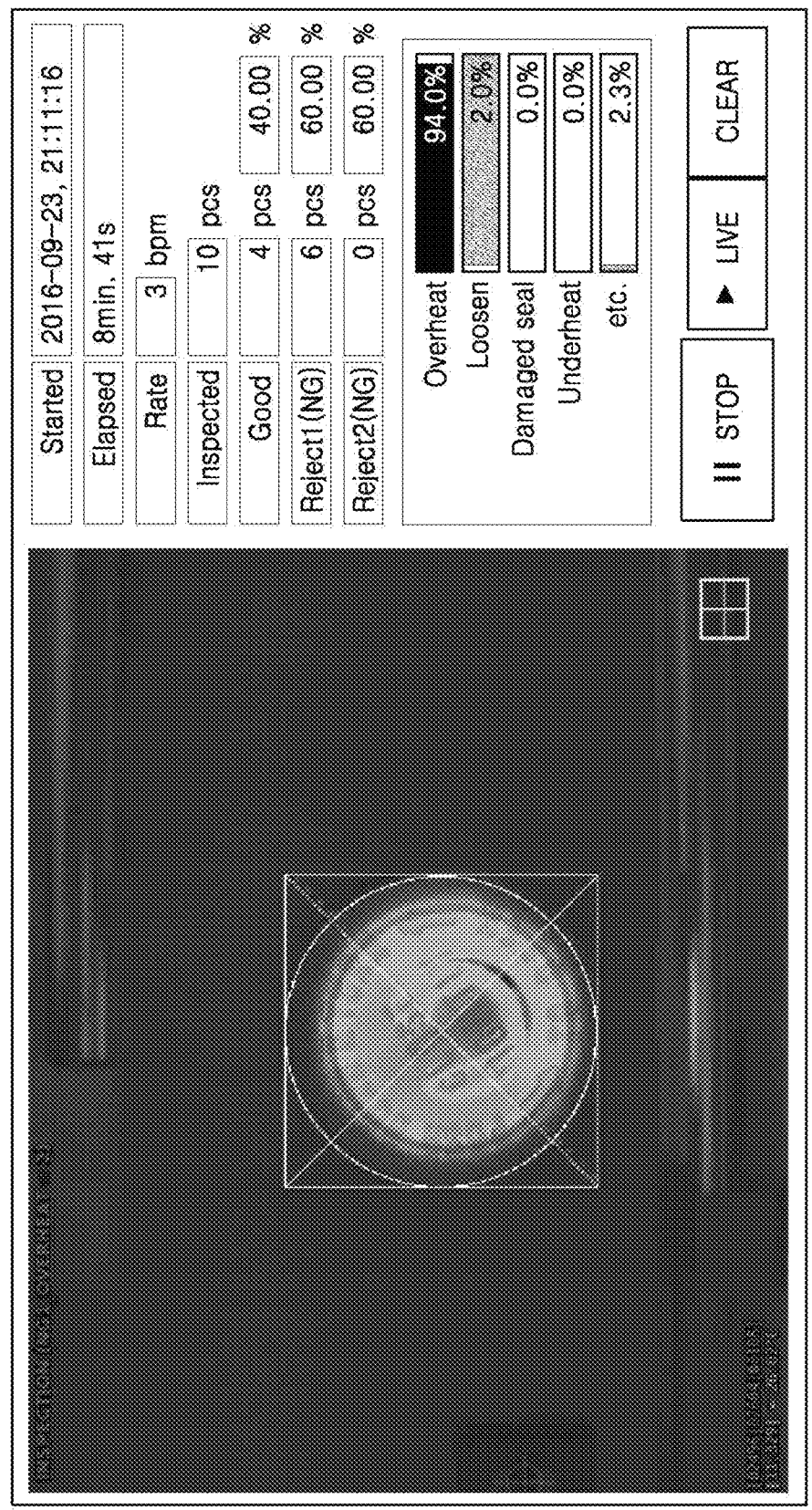
Figure 22:
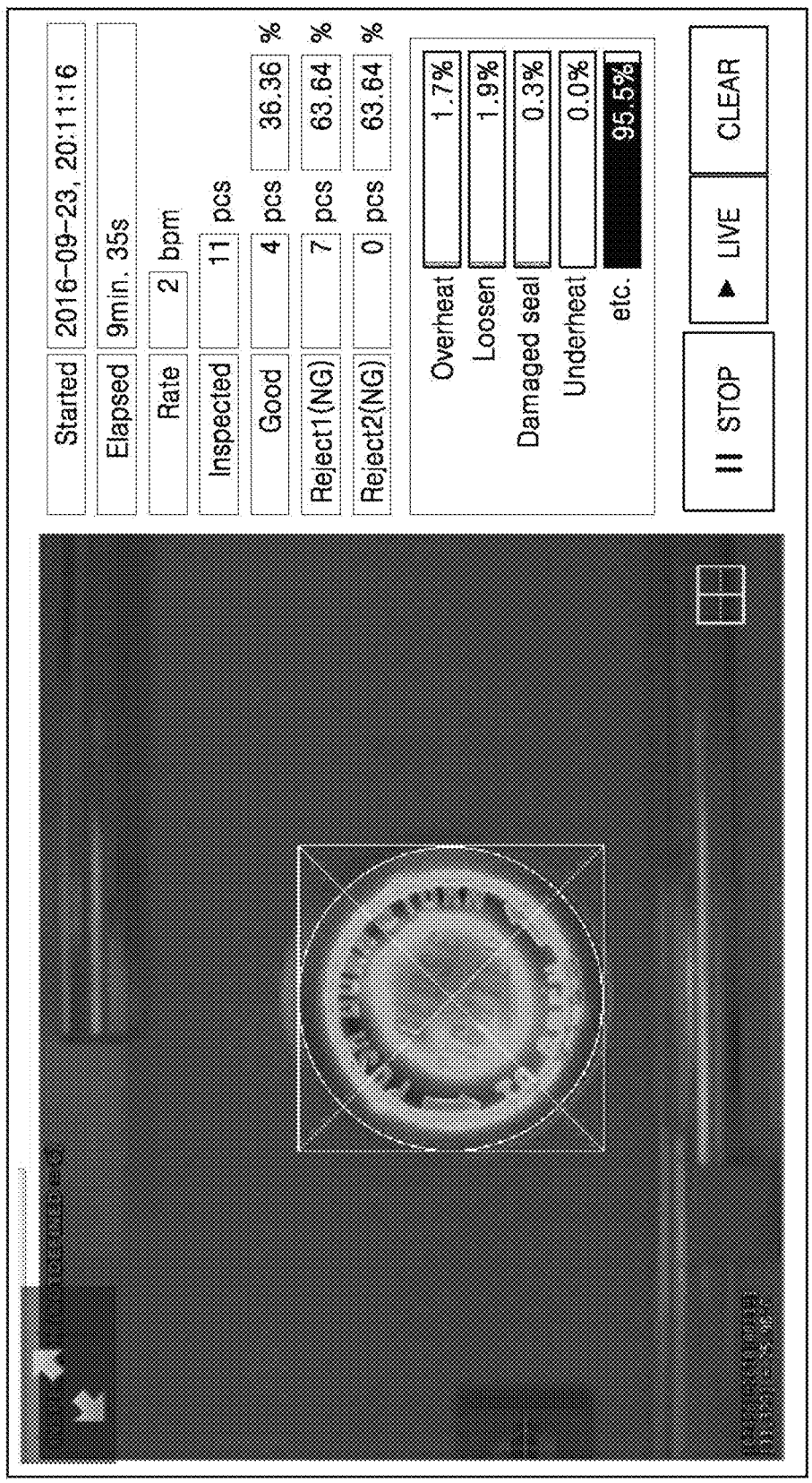
Figure 23:
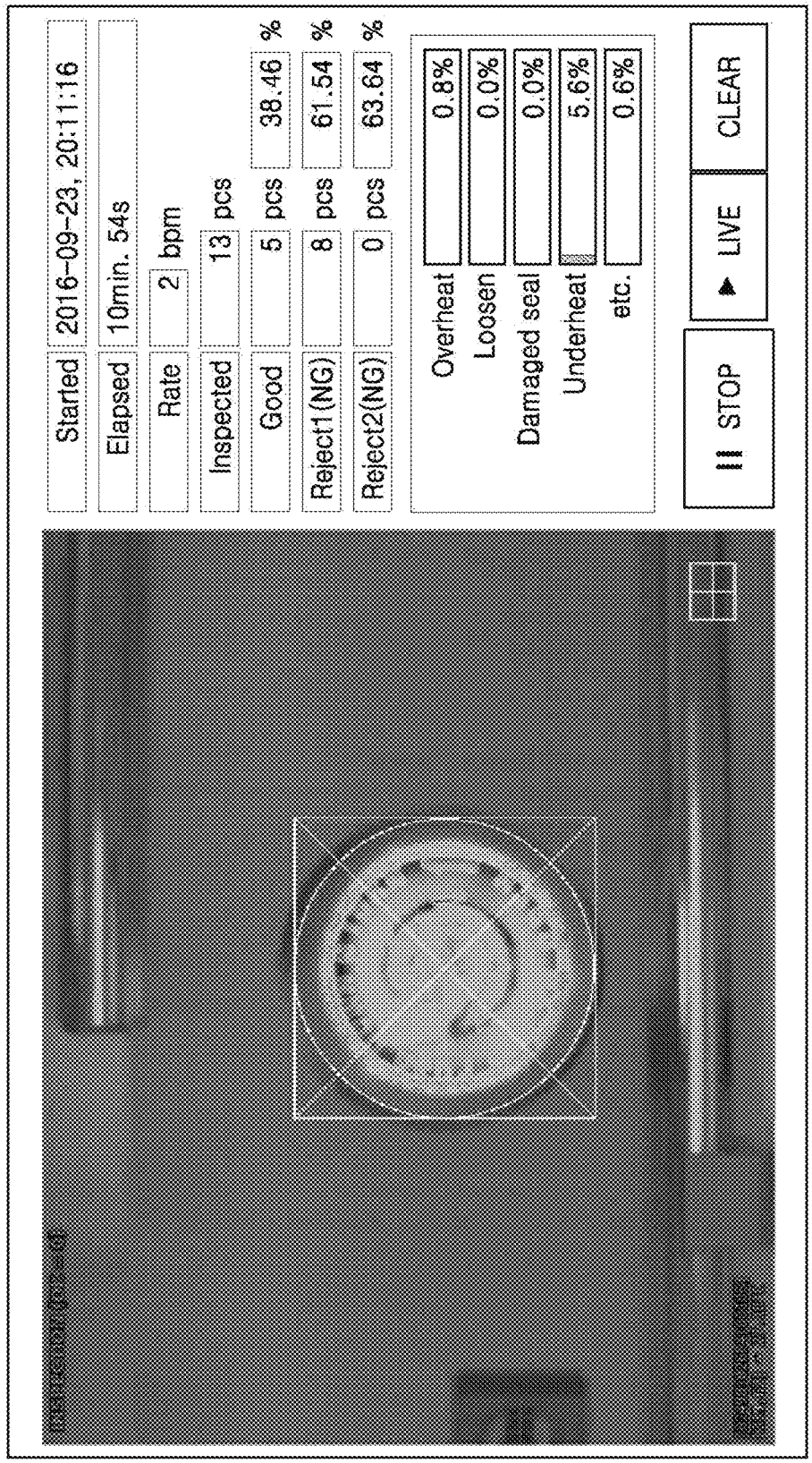
Figure 24:
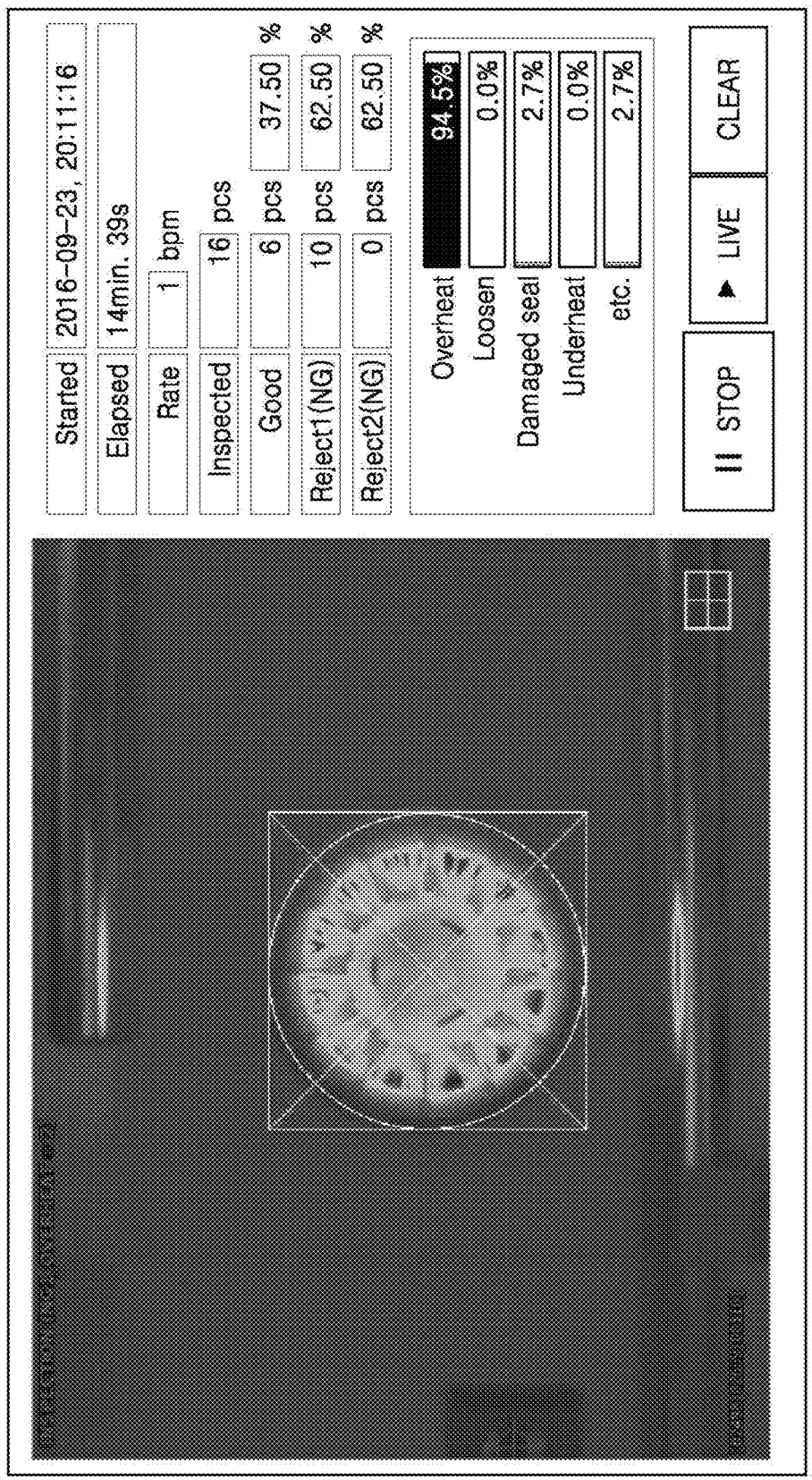
Figure 25:
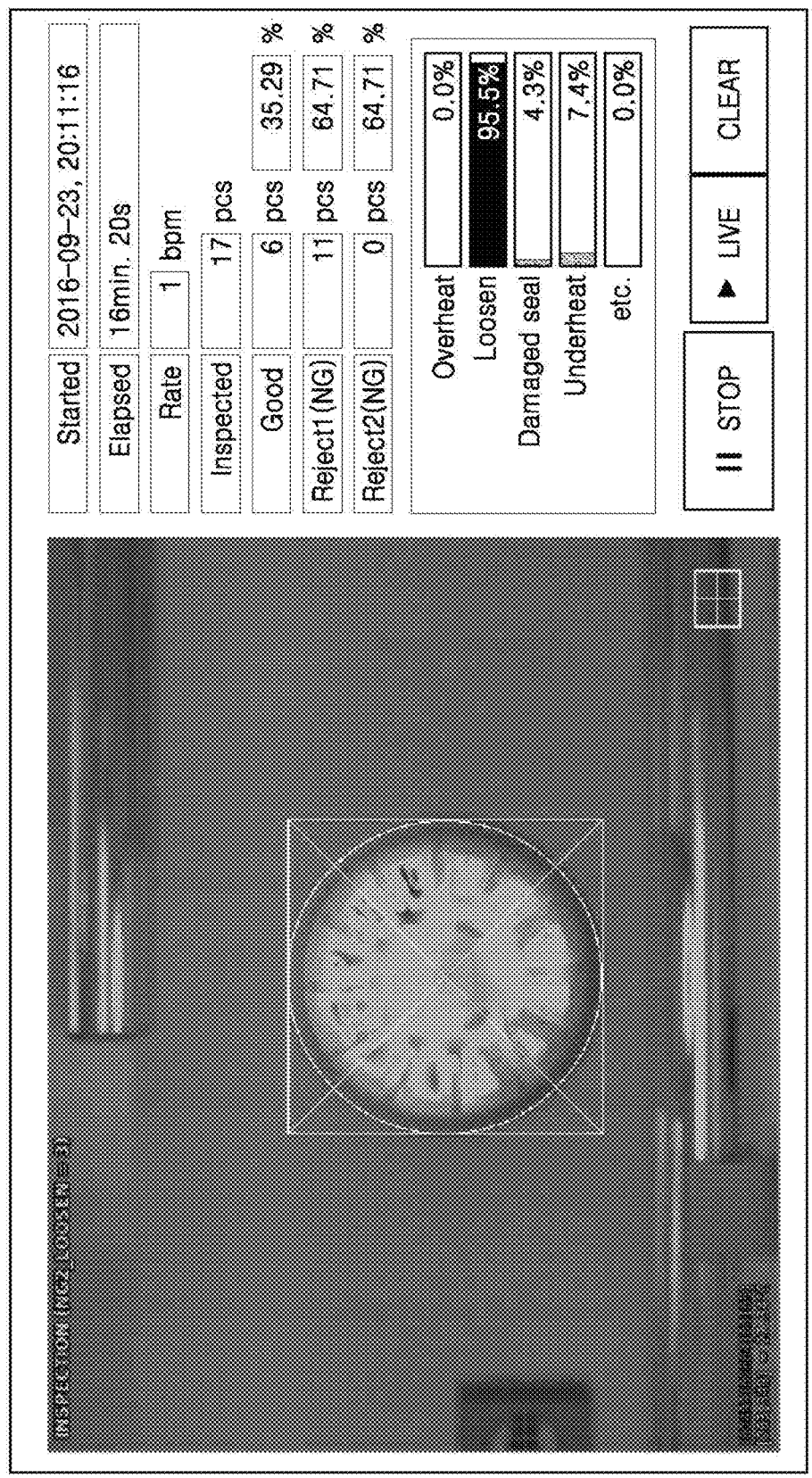
Figure 26:
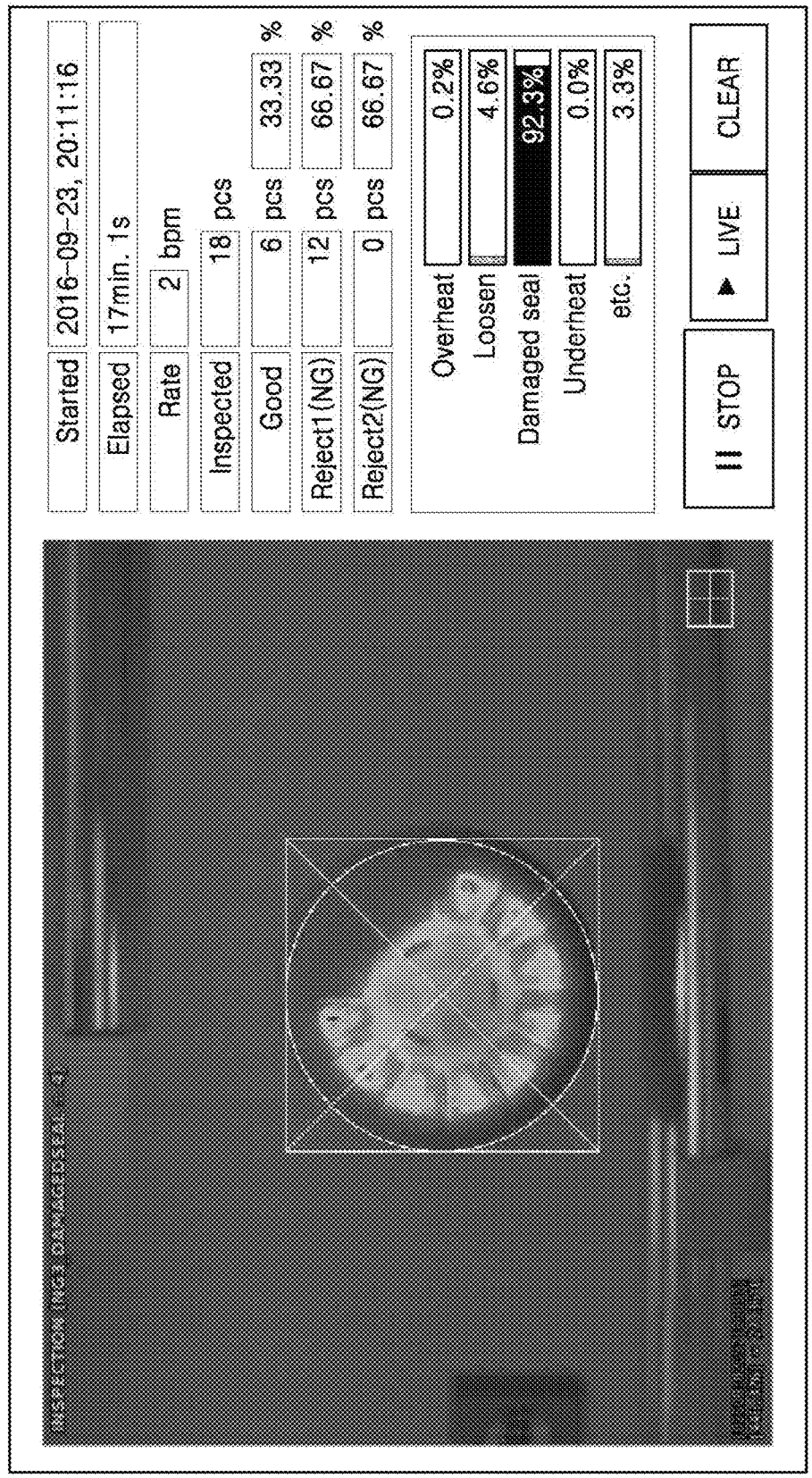
Figure 27:
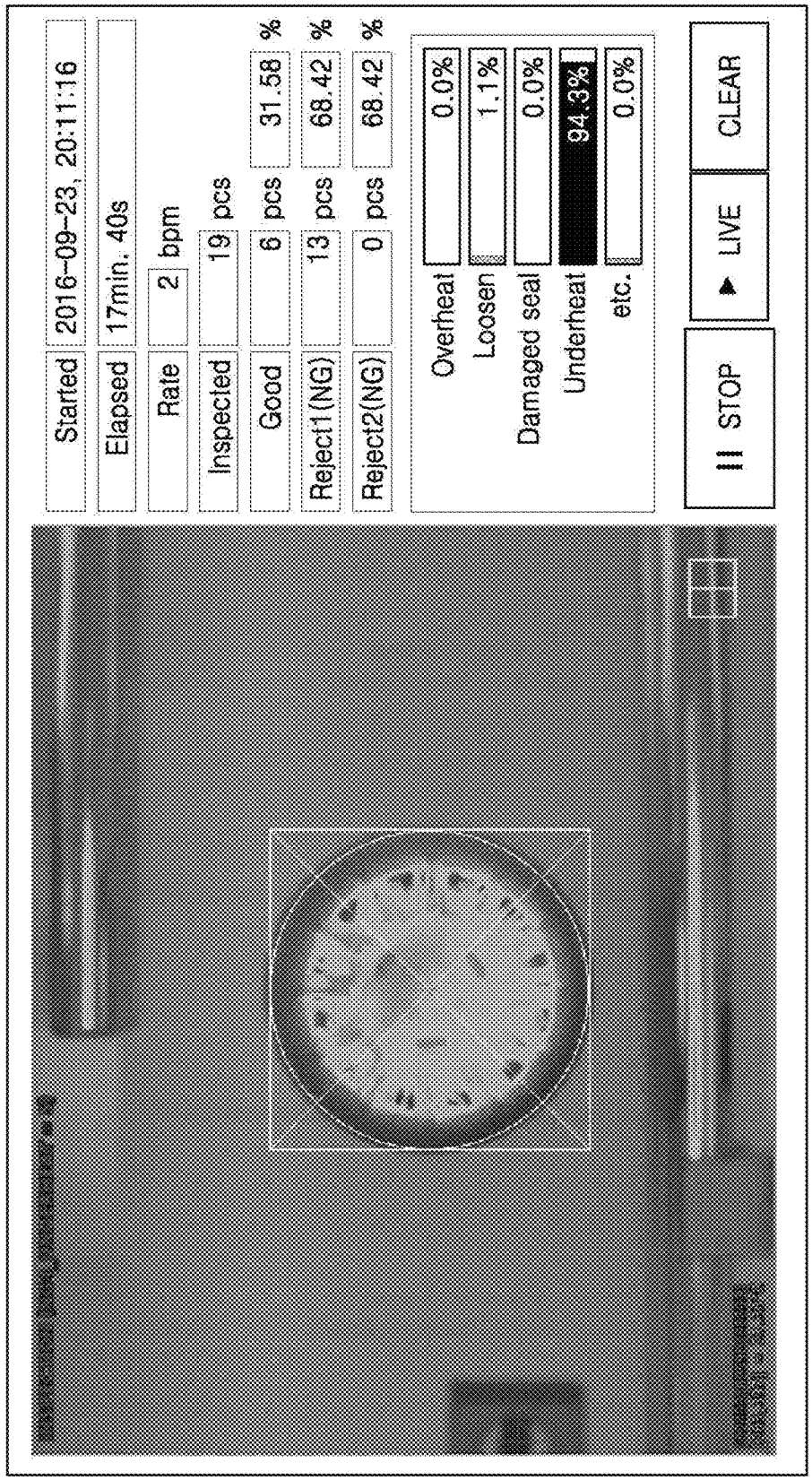
Figure 28:
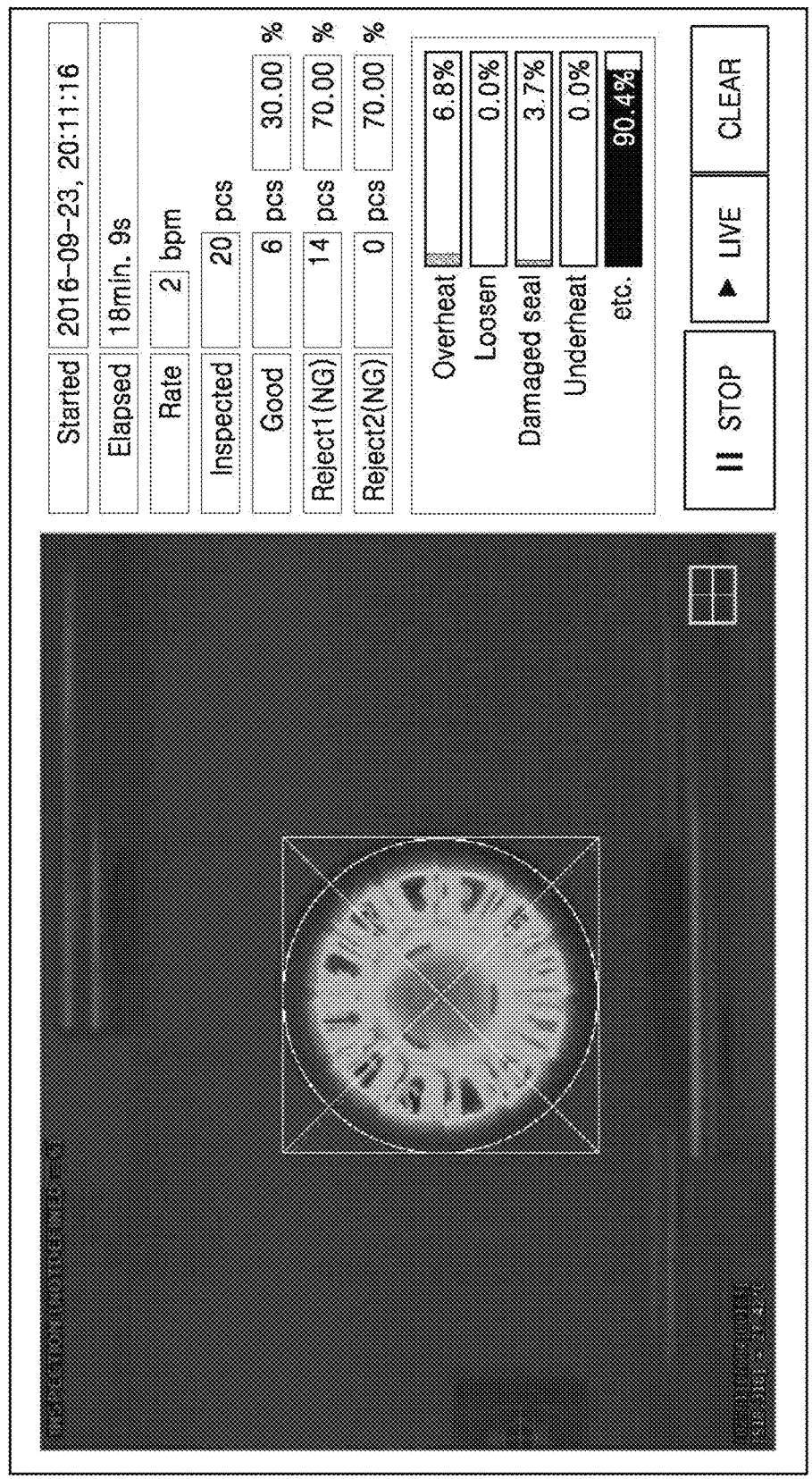

Referring to FIG. 16, a statistical material about a result of actual inspections with respect to one hundred forty-eight (148) pieces of cap sealing of a container based on the sample data learned according to FIGS. 6 to 15 is illustrated.

As a result of the inspections with respect to the total 148 pieces, there are one hundred six (106) good products and forty-two (42) not good products, and the respective numbers of NG1 to NG 5 of not good products are illustrated.

The accuracy prediction portion 340 predicts inspection accuracy of an object to be inspected based on the learned sample data. The inspection apparatus 120 according to the present embodiment may predict quality uniformity and inspection accuracy of an object to be inspected, by using the data learned before an actual inspection begins.

A quantitative method of checking a uniformity index and an inspection accuracy index of an object to be inspected is described below.

A001_OK to A020_OK, A021_NG1 to A30_NG1, A031_NG2 to A40_NG2, and A041_NG3 to A50_NG3 are serial numbers of captured thermal image data. Tags after the serial numbers of thermal image data are previously set through a user input during image capture and, when an image is captured, the tag is tagged on each data file name. Learning based on machine learning is performed on the whole of a captured image set. A machine learning algorithm may be ANN or DNN. After the learning is performed, a learning result data file is created.

Files having a tag "_OK" among the captures images are checked based on a result of the learning. After checking, a confidence score or a probability value is calculated with respect to each data. 1) An average of the probability values is obtained. 2) A standard deviation of the probability values is obtained. 3) A ratio of the number of samples determined to be OK as a result of checking OK samples/the number of samples in which Ground truth is OK is obtained. The values of items 1) to 3) are a quality uniformity index of a sub-material. The "Ground truth" denotes an actual result that an operator knows, that is, whether it is a good product or not, or a type of defect. For data captured for learning, a tag attached on a file name is Ground truth. In this case, however, a case in which a difference between an actual sample state and a tag name is generated due to an operator's error is not assumed.

The inspection accuracy index is calculated as follows.

The captured samples are divided for learning by the following ratio.

Each of types of OK, NG1, NG2, and NG3 is divided at a ratio of 5:5. 50% data of each type is referred to as a teaching data set (TDS), and the other 50% data is referred to as a validation data set (VDS). Learning is performed only with the number of samples corresponding to 10% of TDS data. The number of VDS samples is checked and calculated. A result of the check is calculated as follows.

As a result of checking samples in which Ground truth is OK, a ratio of the number of samples determined to be OK/the number of samples in which Ground truth is OK is indicated by a value between 0 and 1 or by a percentage (%).

As a result of checking samples in which Ground truth is NG1, a ratio of the number of samples determined to be NG1/the number of samples in which Ground truth is NG1 is indicated by a value between 0 and 1 or by a percentage (%).

As a result of checking samples in which Ground truth is NG2, a ratio of the number of samples determined to be NG1/the number of samples in which Ground truth is NG2 is indicated by a value between 0 and 1 or by a percentage (%).

As a result of checking samples in which Ground truth is NG3, a ratio of the number of samples determined to be NG1/the number of samples in which Ground truth is NG3 is indicated by a value between 0 and 1 or by a percentage (%).

The above operations are performed with a ratio of TDS data ranging from 20% to 100% and, when a result of the operations is plotted to a graph, graphs as many as the number of classes are plotted. In other words, four (4) graphs having notes of OK, NG1, NG2, and NG3 may be indicated. The vertical axis denotes inspection accuracy (%) and the horizontal axis denotes the learned item ratio, in this case, the number of samples in use is indicated by 10% to 100%. A change of the ratio is exemplary and the operation may be performed by changing the ratio and tendency according thereto may be provided to a user.

The graph may show inspection accuracy according to the type of each class (OK, NG1 to NG3), and may also show a change in the inspection accuracy according to a change in the number of pieces of learned data and a change in the number of samples to be inspected. The total number of samples may be fifty (50) samples or more, or appropriately two hundred (200) to four hundred (400) samples. The number may be increased as the quality of a sub-material is further irregular and performance of sealing machine decreases. Otherwise, the number may be decreased.

Although in the above description the good product (OK) and three types of not good products are exemplarily described, the present disclosure is not limited thereto and various types of not good products may be inspected in the above-described method according to an embodiment.

The confidence calculation portion 350 calculates a confidence score based on the thermal image data corresponding to the photographed cap sealing and the previously learned sample data.

The controller 300 compares the calculated confidence score and the predefined confidence value range, and determines the cap sealing to be one of a good product, a not good product, and a user check product according to a result of the comparison.

When the cap sealing is determined to be a not good product or a user check product under the control of the controller 300, the classification mechanism driving portion 360 drives the first classification mechanism 200 or the second classification mechanism 210 of FIG. 2.

The confidence score is generally normalized and may be indicated to be 0 to 1 or 0% to 100%. In this case, after inspection operation is performed according to a minimum confidence value (S_min) to a confidence maximum value (S_max) of previously set reference range, if the confidence score is a value within the range, defect rejection is performed, that is, the container determined to be a user check product is collected not in the NG collection box, but in the UC collection box illustrated in FIG. 2. For example, when learning is performed such that a confidence score of a good product or a not good product is normalized and then inspection is performed, if a confidence score of a good product is about 55%, a confidence score of a not good product is about 45%. The determination of a good product with such a confidence score may lead to an increase in the probability of making an incorrect decision. In this case, as the product is classified into a user check product or determined to have a low confidence score, the probability of making an incorrect decision may be reduced.

For example, S_max may be 55% to 80%, and S_min may be 20% to 45%. For a precise inspection result, S_min may be about 20%, and S_max may be about 80%. In this case, the confidence scores of 21% to 79% are all processed to be a user check product or an ambiguous result. For a loose inspection result, S_min may be about 40%, and S_max may be about 60%. In this case, the confidence scores of 41% to 59% are all processed to be a user check product or an ambiguous result.

FIGS. 17 to 28 are exemplary views for explaining determining the types of a good product and a not good product with respect to cap sealing of a container based on learned data.

Figure 29:
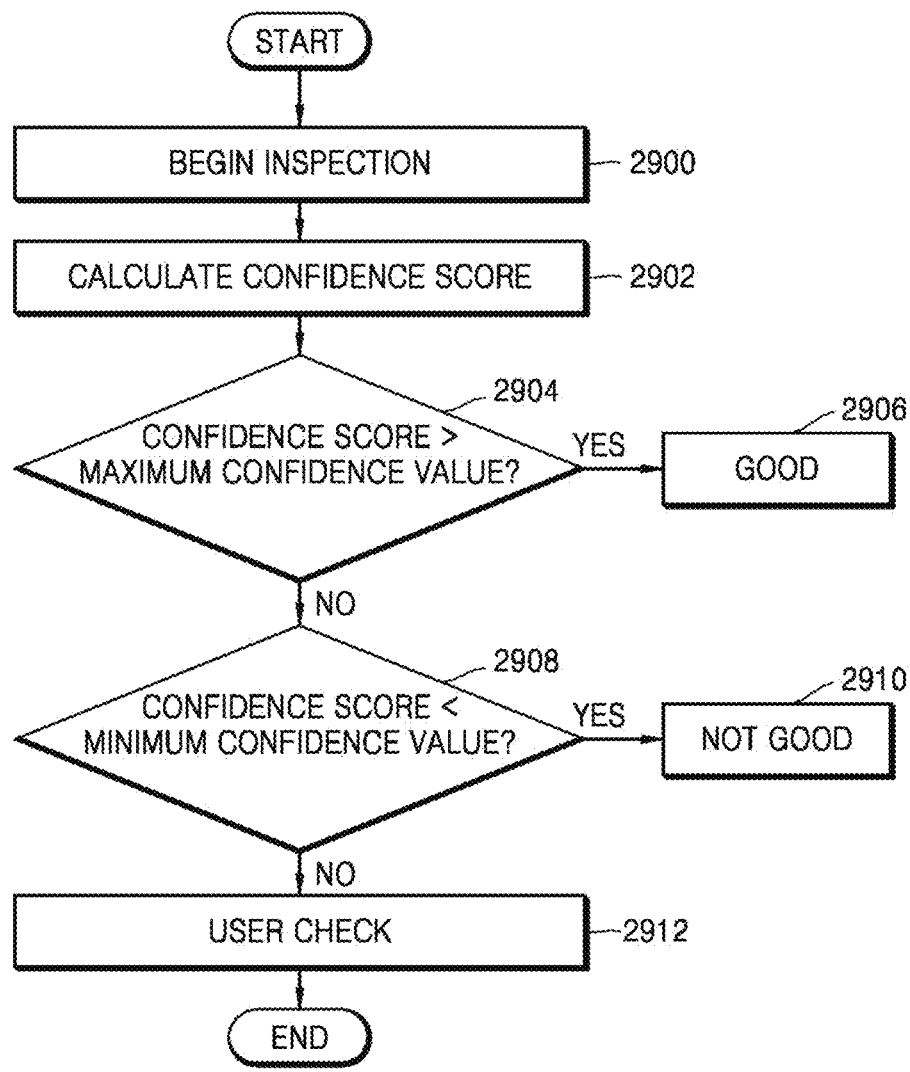
FIG. 29 is a flowchart of an inspection method according to another embodiment

FIG. 29 is a flowchart of an inspection method according to another embodiment.

Referring to FIG. 29, in an operation 2900, inspection on cap sealing of a container begins.

In an operation 2902, a confidence score of the photographed cap sealing of a container is calculated based on the previously learned sample data.

If, in an operation 2904, the confidence score is greater than the maximum confidence value, the product is determined to be a good product in an operation 2906.

If, in the operation 2904, the confidence score is less that maximum confidence value, it is determined in an operation 2908 whether the confidence score is less than minimum confidence value.

If the confidence score is less than the minimum confidence value, the product is determined to be a not good product in an operation 2910.

If, in an operation 2908, the confidence score is not less than the minimum confidence value, the product is determined to be a user check product in an operation 2912

In the inspection method according to the present embodiment, during the analysis of thermal image data with respect to the cap sealing of a particular container, when a product has a low confidence score, the product is not determined to be a good product or a not good product, but is rejection-processed and separately classified into a user check product.

FIGS. 30A-30F are exemplary views for explaining inspection accuracy prediction according to another embodiment.

Figure 30A:
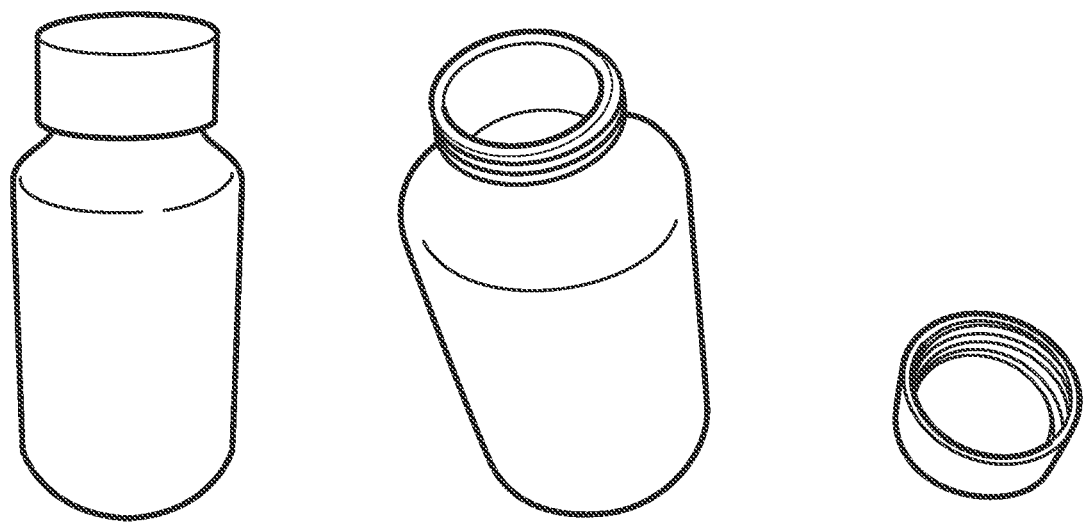
Figure 30C:
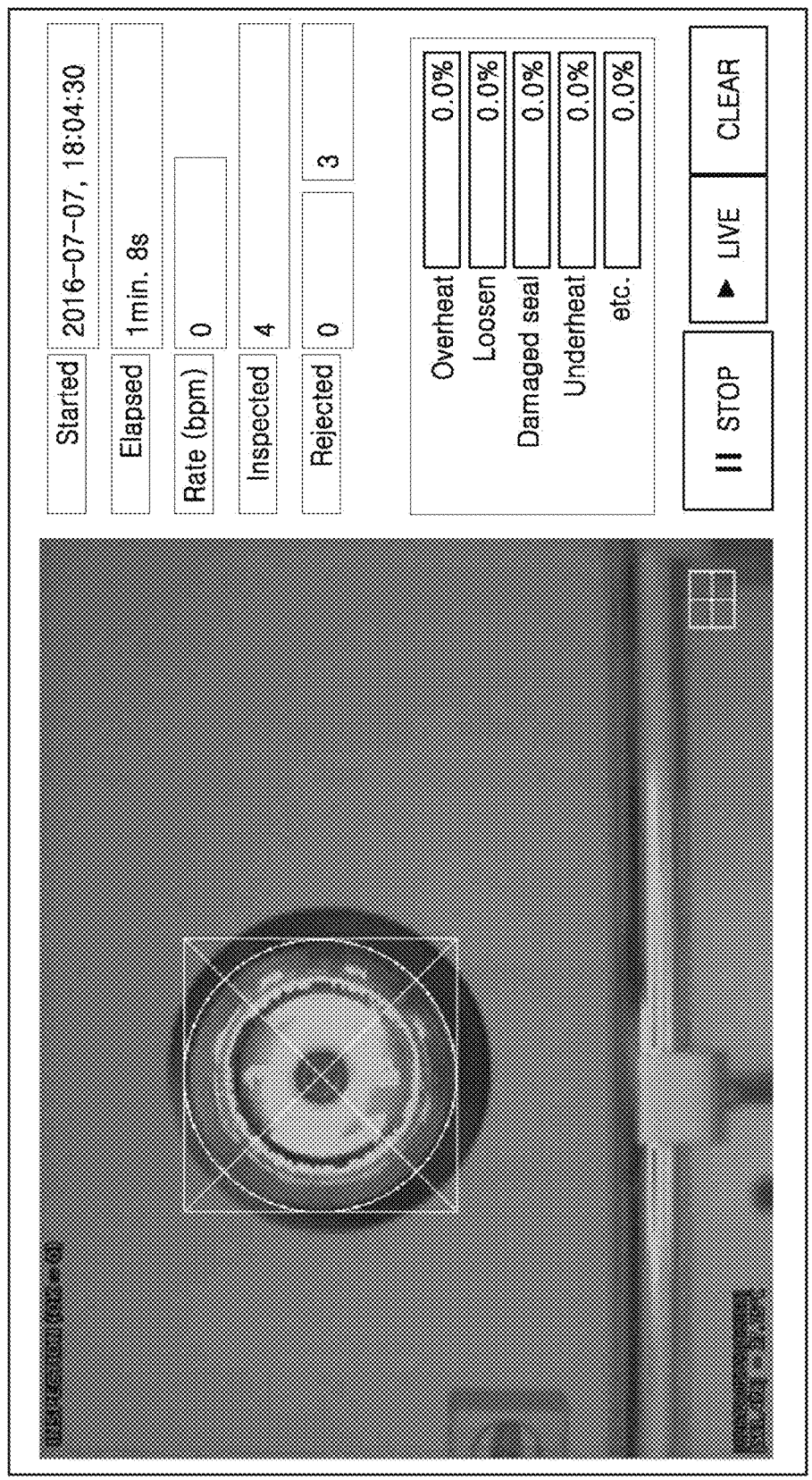
Figure 30D:
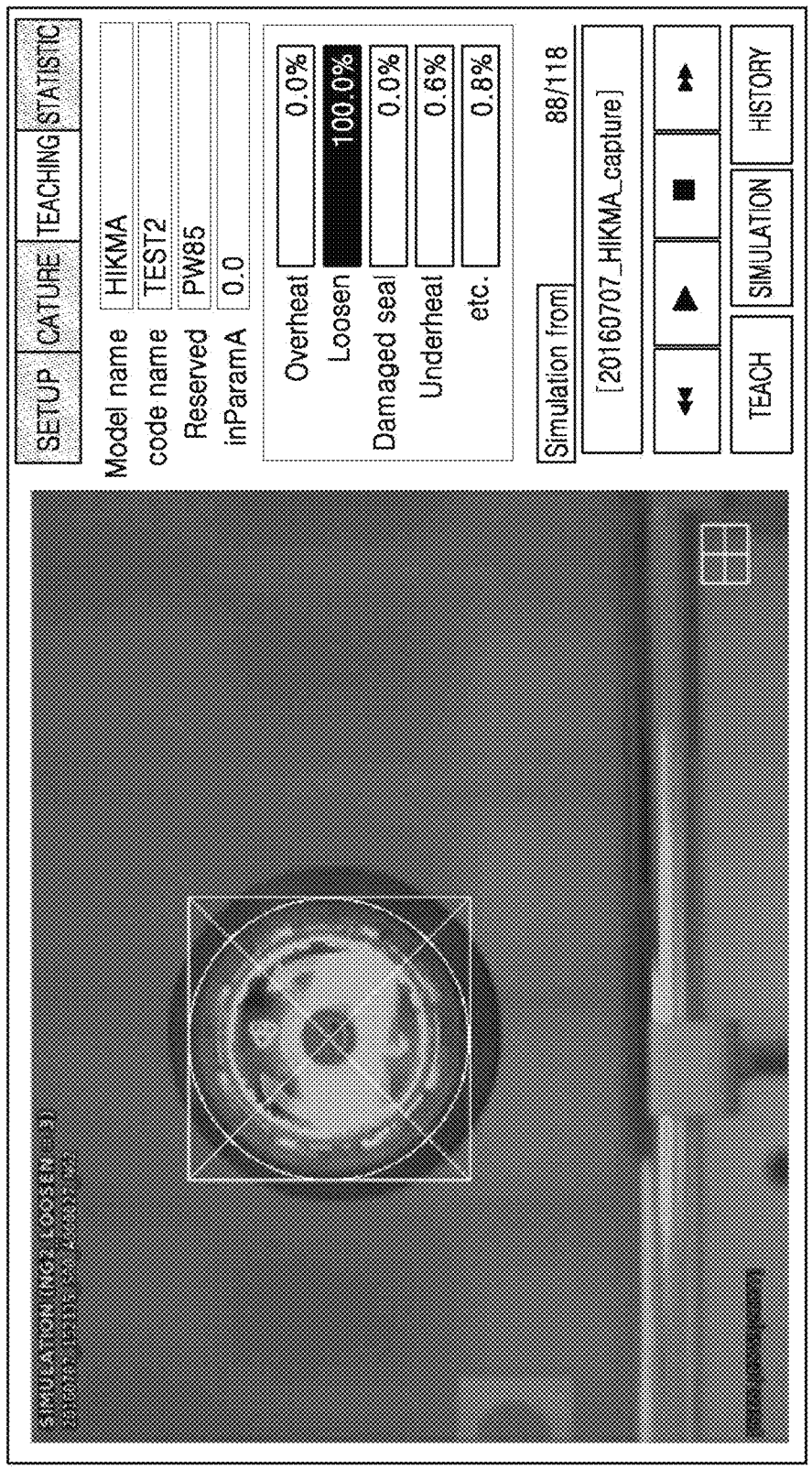
Figure 30E:
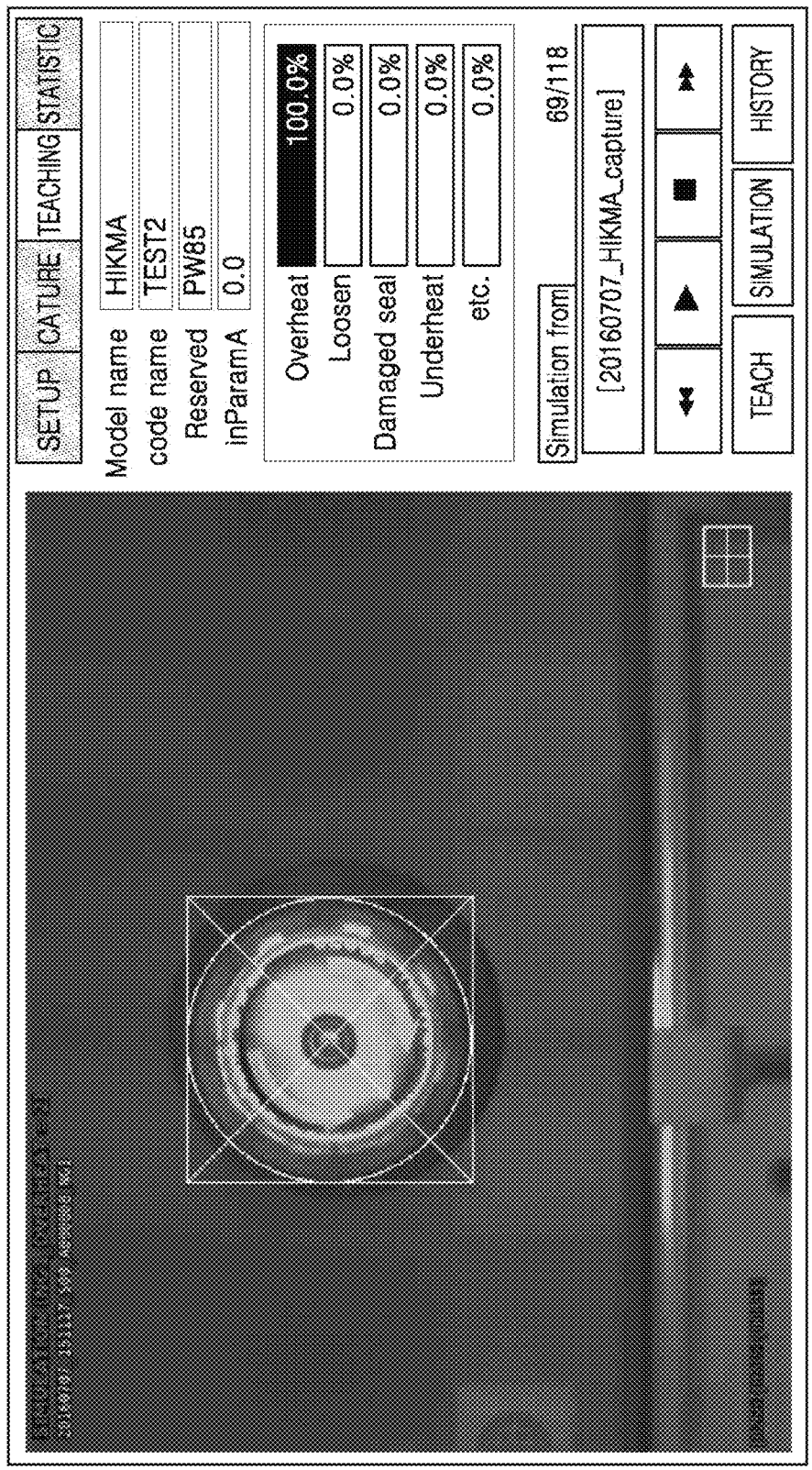
Figure 30F:
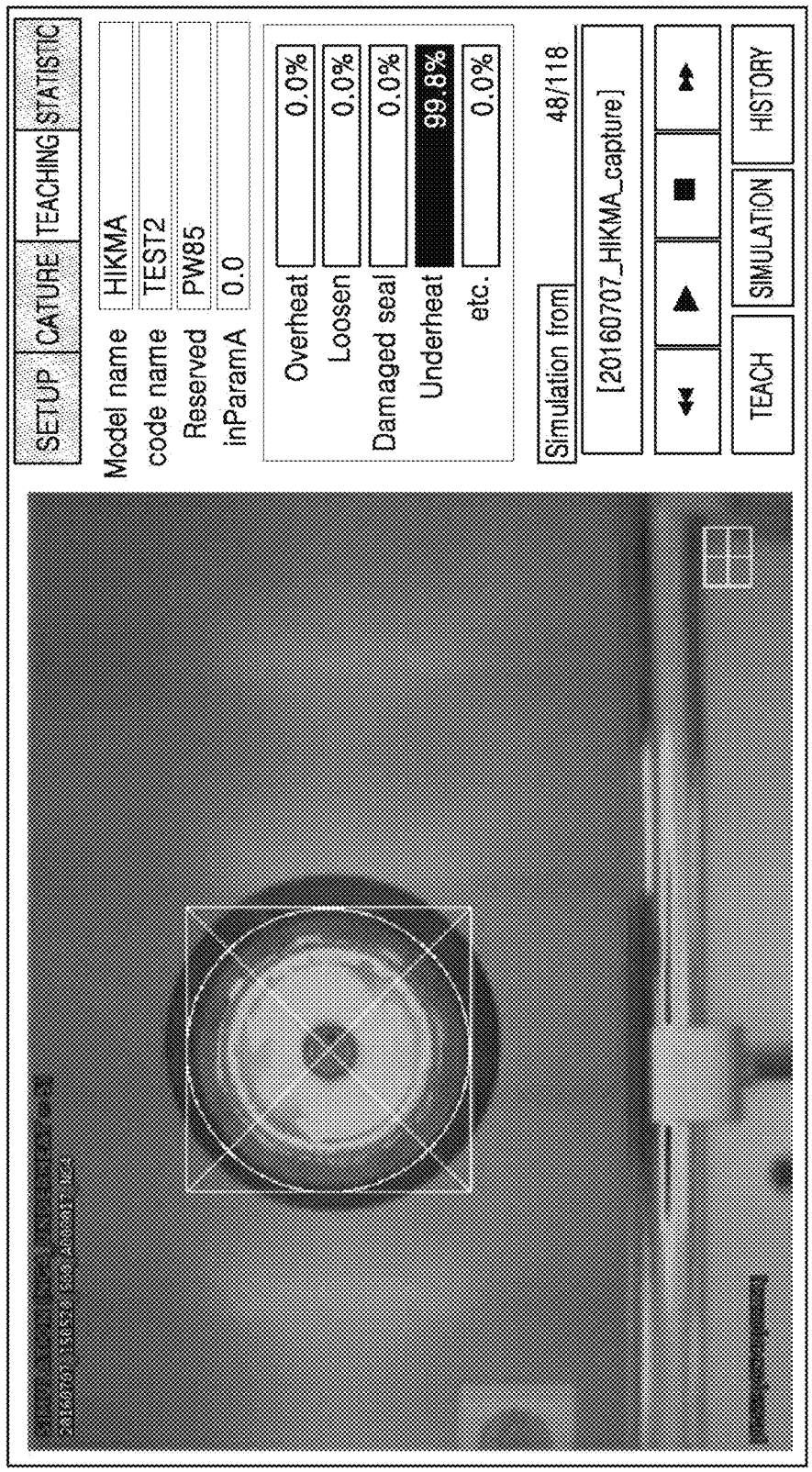

Referring to FIG. 30A, the following container and cap samples are illustrated. The diameter of the cap is about 38 mm, a cap type is CRC, and the container has a size of about 103 mm×51 mm.

One hundred fifty-eight (158) samples are used for a test, which includes seventy (70) good products and eighty-eight (88) not good products that are arbitrarily manufactured. The not good products include twenty-eight (28) of Fault Type 1 (Loosen), thirty (30) of Fault Type 2 (Overheat), and thirty (30) of Fault Type 3 (Underheat).

Referring to FIG. 30B, the uniformity of a sub-material is 100%, and predicted inspection accuracy is 99.4%. FIGS. 30C-30F illustrate thermal image data about cap sealing with respect to a good product and fault types, and indications of fault types and confidence scores.

The inspection apparatus according to the present embodiment may provide inspection accuracy and predicted inspection accuracy for each type of a sample container.

FIGS. 31A-31G are exemplary views for explaining inspection accuracy prediction according to another embodiment.

Figure 31A:
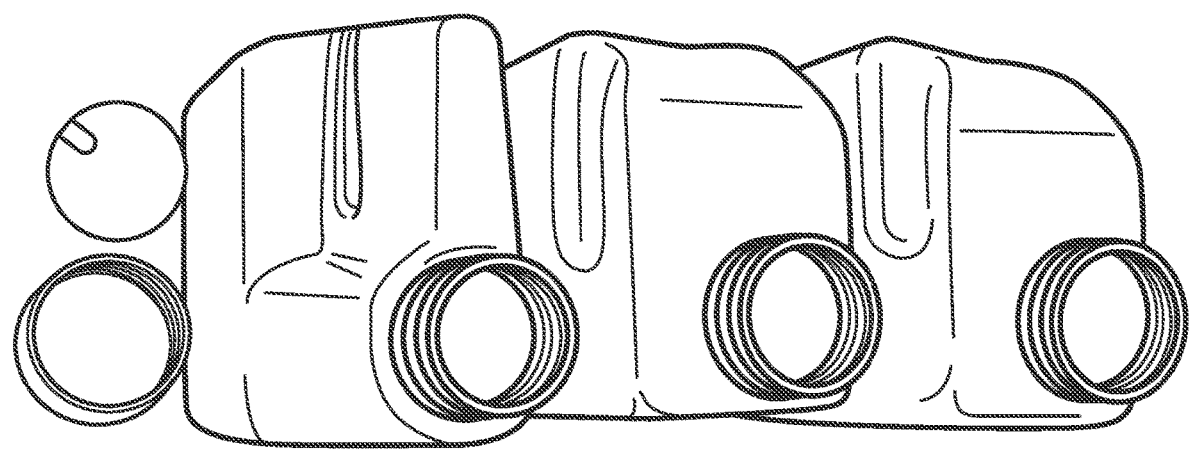
Figure 31C:
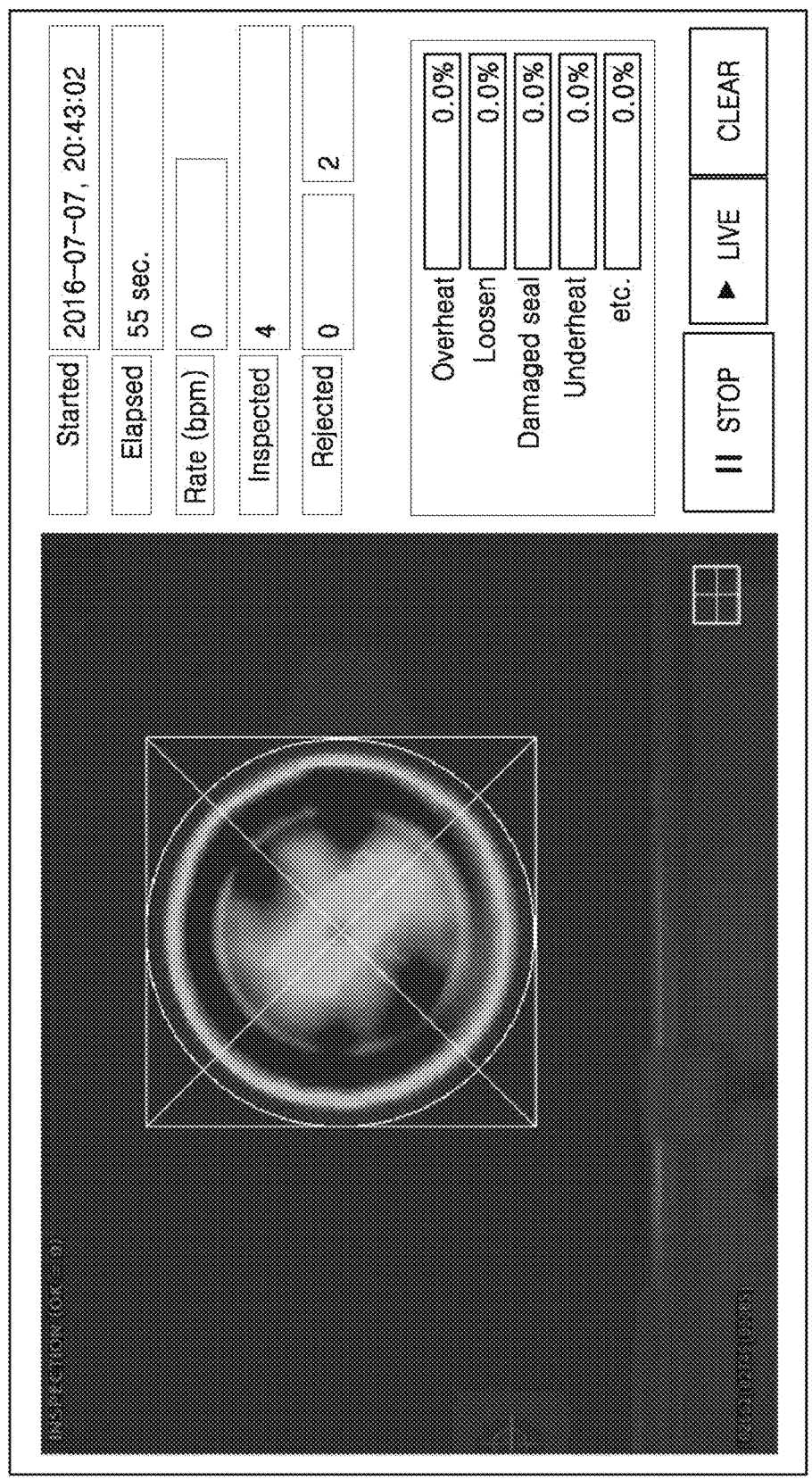
Figure 31D:
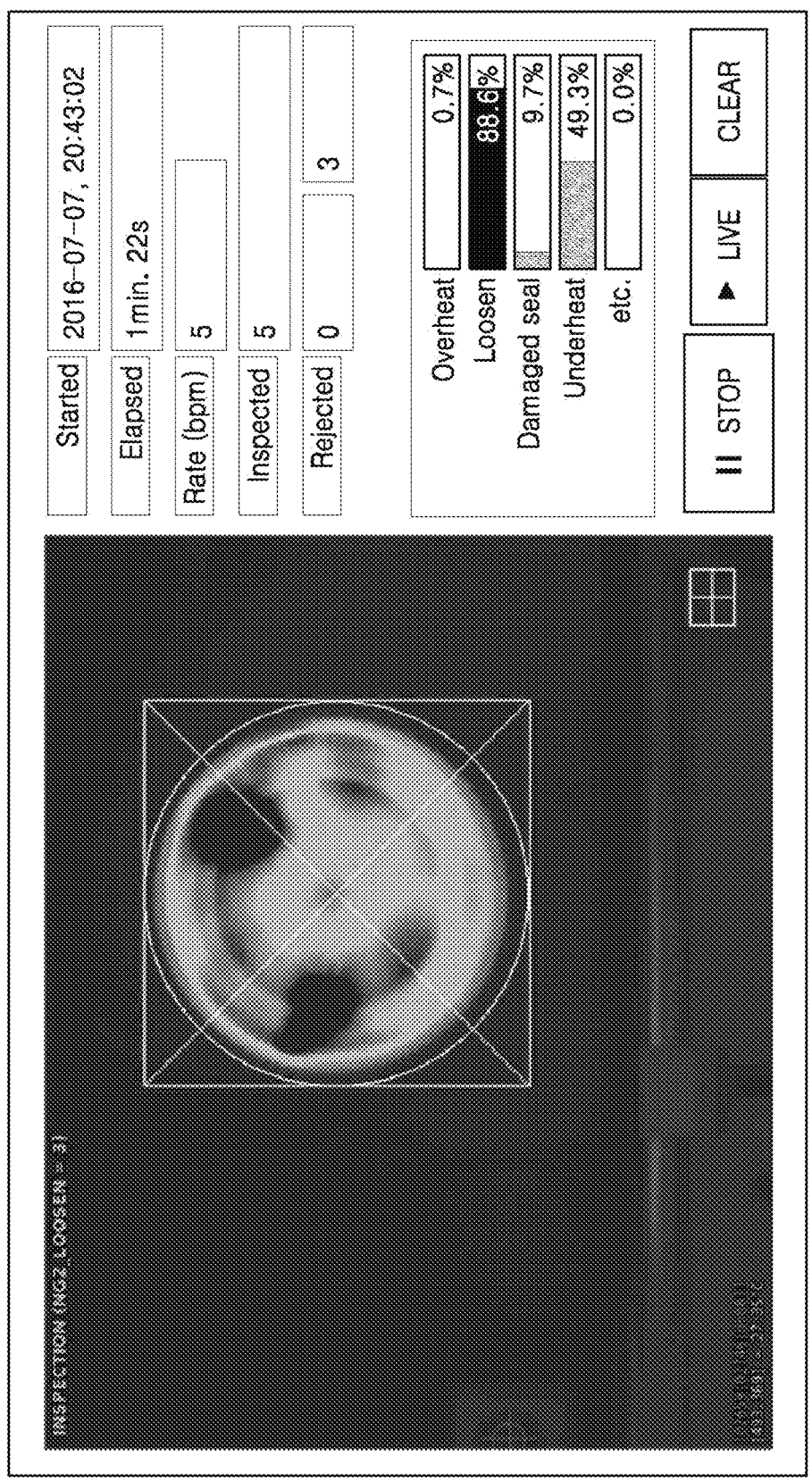
Figure 31E:
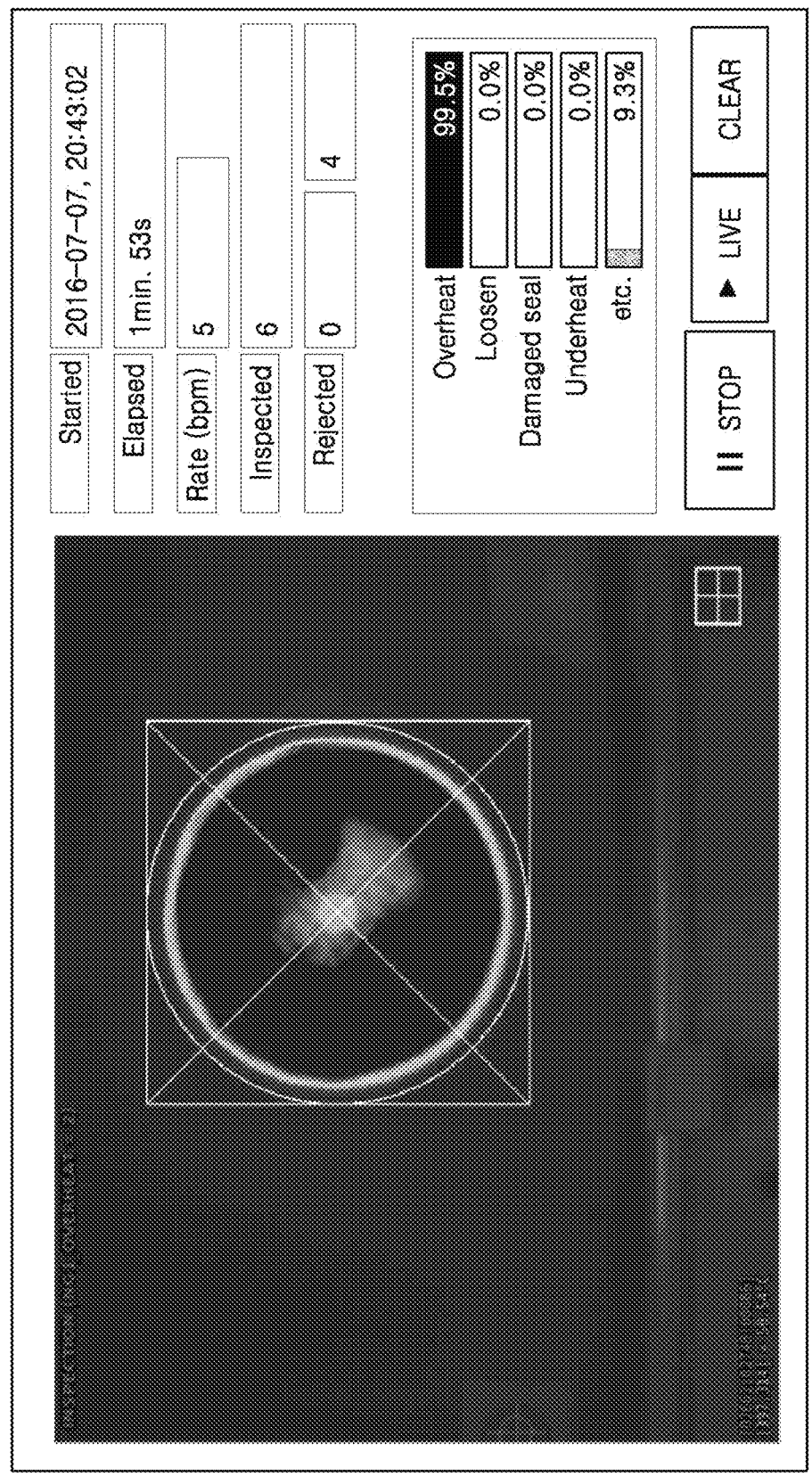
Figure 31F:
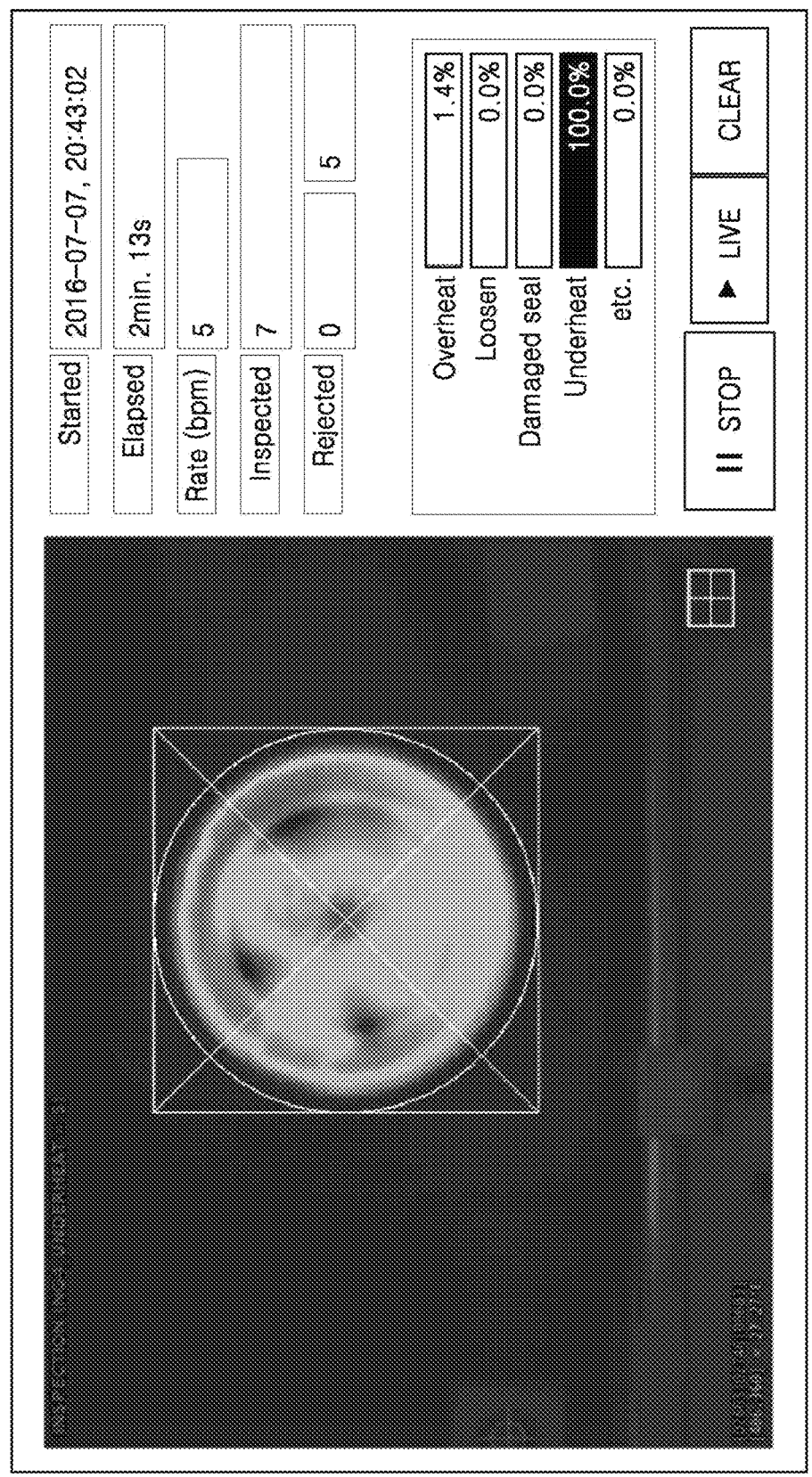
Figure 31G:
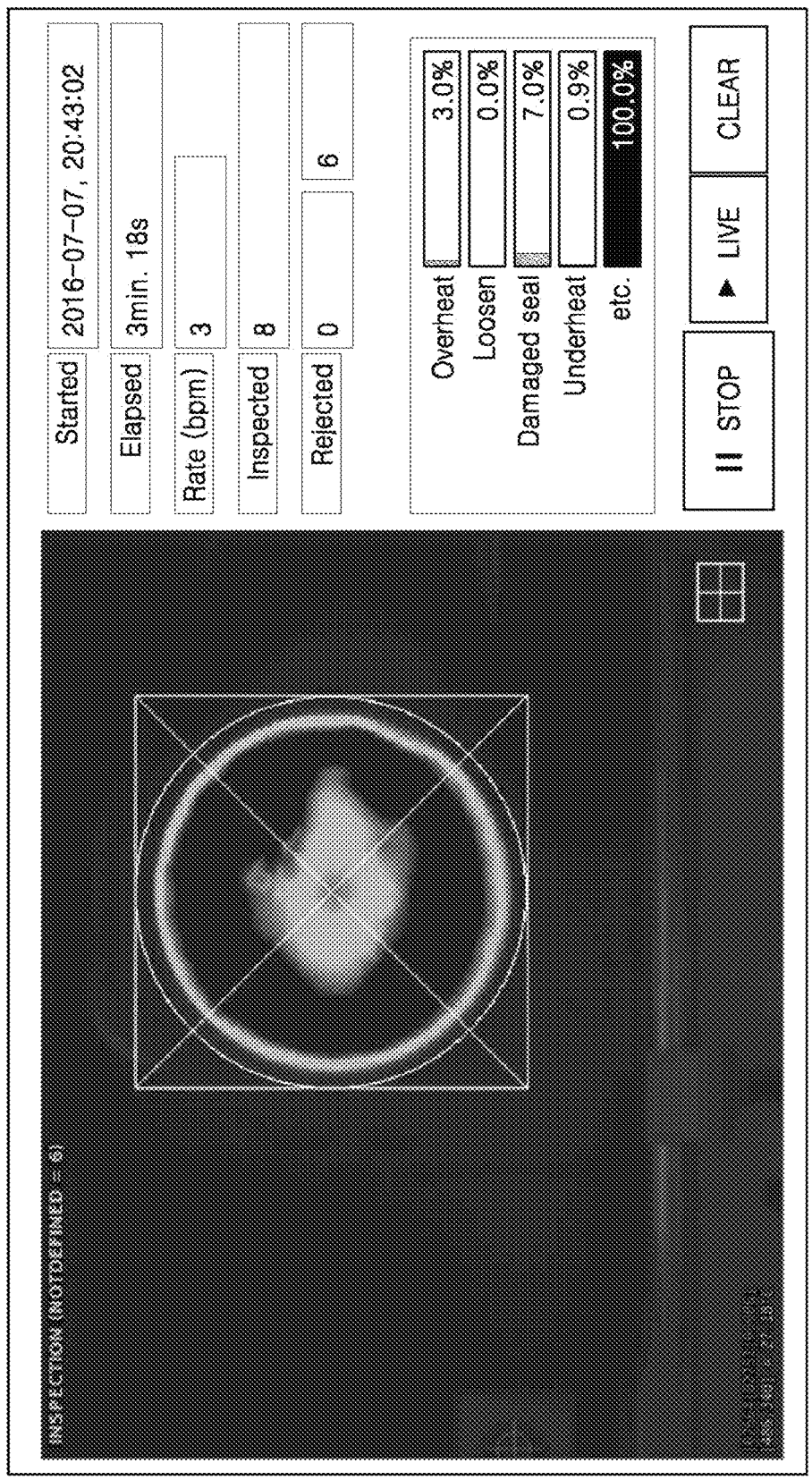

Referring to FIG. 31A, the following container and cap samples are illustrated. The diameter of the cap is about 47 mm, a cap type is Normal, and the container has a size of about 83 mm×150 mm×115 mm.

Thirty-eight (38) samples are used for a test, which includes fourteen (14) good products and twenty-four (24) not good products that are arbitrarily manufactured. The not good products include six (6) of Fault Type 1 (Loosen), five (5) of Fault Type 2 (Overheat), six (6) of Fault Type 3 (Underheat), and seven (7) of Fault Type 4 (Reversed Seal).

Referring to FIG. 31B, the uniformity of a sub-material is 85.7%, and predicted inspection accuracy is 94.7%. FIGS. 31C-31G illustrate thermal image data about cap sealing with respect to a good product and fault types, and indications of fault types and confidence scores.

The inspection apparatus according to the present embodiment may provide inspection accuracy and predicted inspection accuracy for each type of a sample container.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

The present inventive concept may be described in terms of functional block components and various processing steps. Such functional blocks may be realized by any number of hardware and/or software components configured to perform the specified functions. For example, the present inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the present inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical". It will be recognized that terms "comprising," "including," and "having," as used herein, are specifically intended to be read as open-ended terms of art.

The use of terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or language (e.g., "such as") provided herein, is intended merely to better illuminate the inventive concept and does not pose a limitation on the scope of the inventive concept unless otherwise claimed. Numerous modifications and adaptations will be readily apparent to those of ordinary skill in this art without departing from the spirit and scope of the inventive concept.

The invention claimed is:

1. A method of inspecting cap sealing of a container transferred along a process line, by using an infrared (IR) camera, the method comprising:
   photographing the cap sealing of the container located within a field of view (FOV) of the IR camera by using the IR camera;
   calculating a confidence score based on previously learned sample data and thermal image data corresponding to the photographed cap sealing; and
   comparing the calculated confidence score with a predefined confidence value range, and determining the cap sealing to be one of a good product, a not good product, and a user check product according to a result of the comparison,
   wherein, the previously learned sample data is generated by learning a plurality of cap sealing of the container according to the types of a good product and a not good product,
   the method further comprising predicting inspection accuracy of an object to be inspected based on the previously learned sample data; and displaying the predicted inspection accuracy.

2. The method of claim 1, wherein, in the determining of the cap sealing, when the confidence score is greater than a maximum confidence value of the predefined confidence value range, the cap sealing is determined to be a good product, when the confidence score is less than a minimum confidence value of the predefined confidence value range, the cap sealing is determined to be a not good product, and when the confidence score is equal to or greater than the minimum confidence value and equal to or less than the maximum confidence value, the cap sealing is determined to be a user check product.

3. The method of claim 2, wherein the maximum confidence value and the minimum confidence value are determined by a user's selection.

4. The method of claim 1, further comprising driving classification mechanisms to respectively and separately collect containers determined to be the not good product and the user check product.

5. The method of claim 1, further comprising displaying the thermal image data, the calculated confidence score, and a type of the not good product.

6. The method of claim 1, wherein a type of the not good product comprises at least one of Overheat, Loosen, Damaged seal, and Underheat, and
the previously learned sample data is learned based on cap sealing of a container corresponding to the good product and cap sealing of a container corresponding to the not good product including at least one of Overheat, Loosen, Damaged seal, and Underheat.

7. The method of claim 5, wherein the previously learned sample data is learned by using any one of a learning base or a feature base.

8. A non-transitory computer readable storage medium having stored thereon a program, which when executed by a computer, performs the method defined in claim 1.

9. An apparatus for inspecting cap sealing of a container transferred along a process line, by using an infrared (IR) camera, the apparatus comprising:
an IR camera photographing the cap sealing of the container located within a field of view (FOV) of the IR camera; and
a controller calculating a confidence score based on previously learned sample data and thermal image data corresponding to the photographed cap sealing, comparing the calculated confidence score with a predefined confidence value range, and determining the cap sealing to be one of a good product, a not good product, and a user check product according to a result of the comparison,
wherein, the previously learned sample data is generated by learning a plurality of cap sealing of the container according to the types of a good product and a not good product,
the controller predicting inspection accuracy of an object to be inspected based on the previously learned sample data and displaying the predicted inspection accuracy.

10. The apparatus of claim 9, wherein the controller determines the cap sealing to be a good product when the confidence score is greater than a maximum confidence value of the predefined confidence value range, determines the cap sealing to be a not good product when the confidence score is less than a minimum confidence value of the predefined confidence value range, and determines the cap sealing to be a user check product when the confidence score is equal to or greater than the minimum confidence value and equal to or less than the maximum confidence value.

11. The apparatus of claim 10, wherein the maximum confidence value and the minimum confidence value are determined by a user's selection.

12. The apparatus of claim 9, further comprising:
a first collection box collecting the not good product;
a second collection box collecting the user check product; and
a first classification mechanism pushing the not good product toward the first collection box and a second classification mechanism pushing the user check product toward the second collection box, the first and second classification mechanisms being provided in a classification session next to an inspection session of the process line,
wherein the controller drives the first classification mechanism or the second classification mechanism so that containers determined to be the not good product and the user check product are respectively and separately collected in the first collection box and the second collection box.

13. The apparatus of claim 9, further comprising a display portion displaying the thermal image data, the calculated confidence score, and a type of the not good product.

14. The apparatus of claim 9, wherein a type of the not good product comprises at least one of Overheat, Loosen, Damaged seal, and Underheat, and
the previously learned sample data is learned based on cap sealing of a container corresponding to the good product and cap sealing of a container corresponding to the not good product including at least one of Overheat, Loosen, Damaged seal, and Underheat.

15. The apparatus of claim 8, wherein the apparatus comprises at least one of a first mode for actual inspection, a second mode for sample data learning and a third mode for inspection accuracy prediction.

* * * * *